US012641661B2

(12) United States Patent
Tamura

(10) Patent No.: US 12,641,661 B2
(45) Date of Patent: May 26, 2026

(54) COMMUNICATION SYSTEM, CONTROL DEVICE, COMMUNICATION TERMINAL, COMMUNICATION DEVICE, AND COMMUNICATION METHOD

(71) Applicant: NEC Corporation, Tokyo (JP)

(72) Inventor: Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 309 days.

(21) Appl. No.: 18/423,900

(22) Filed: Jan. 26, 2024

(65) Prior Publication Data

US 2024/0179775 A1     May 30, 2024

Related U.S. Application Data

(63) Continuation of application No. 18/132,665, filed on Apr. 10, 2023, now Pat. No. 11,924,900, which is a
(Continued)

(30) Foreign Application Priority Data

May 26, 2016     (JP) ................................. 2016-105254

(51) Int. Cl.
*H04W 76/16*          (2018.01)
*H04L 12/14*          (2024.01)
(Continued)

(52) U.S. Cl.
CPC ............. *H04W 76/16* (2018.02); *H04L 12/14* (2013.01); *H04L 12/1403* (2013.01);
(Continued)

(58) Field of Classification Search
CPC ............. H04M 15/66; H04W 36/0064; H04W 36/0085; H04W 4/00; H04W 4/24;
(Continued)

(56) References Cited

U.S. PATENT DOCUMENTS

2010/0238903 A1     9/2010   Kitazoe
2014/0241317 A1     8/2014   Jamadagni et al.
(Continued)

FOREIGN PATENT DOCUMENTS

EP          3384698 A1     10/2018
EP          3457734 A1      3/2019
(Continued)

OTHER PUBLICATIONS

3GPP TS 23.203 V13.7.0 Policy and charging control architecture (Release 13) (Mar. 2016) (pp. 1-242).
(Continued)

*Primary Examiner* — Elton Williams

(57)          ABSTRACT

In order to provide a communication system capable of charging control in accordance with a bearer used by a UE even when the UE performs dual connectivity, a communication system according to the present disclosure includes a communication terminal (11) configured to communicate with a communication device (12) and a communication device (13) by using a different radio bearer for each of the communication device (12) and the communication device (13), and a control device (14) configured to determine whether to cause the communication device (12) to measure the traffic of each radio bearer.

9 Claims, 29 Drawing Sheets

| Bit | Description |
|---|---|
| 0 | UTRAN Not Allowed |
| 1 | GERAN Not Allowed |
| 2 | GAN Not Allowed |
| 3 | I-HSPA-Evolution Not Allowed |
| 4 | WB-E-UTRAN Not Allowed |
| 5 | HO-To-Non-3GPP-Access Not Allowed |
| 6 | NB-IoT Not Allowed |
| 7 | 5G RAT Not Allowed |
| 8 | WB-E-UTRAN and WLAN DC Not Allowed |
| 9 | WB-E-UTRAN and Unlicensed WB-E-UTRAN DC Not Allowed |
| 10 | WB-E-UTRAN and 5G RAT DC Not Allowed |
| 11 | 5G RAT and WLAN DC Not Allowed |
| 12 | 5G RAT and Unlicensed 5G RAT DC Not Allowed |
| 13 | Any DC Not Allowed |

Related U.S. Application Data continuation of application No. 16/835,668, filed on Mar. 31, 2020, now Pat. No. 11,659,610, which is a continuation of application No. 16/200,242, filed on Nov. 26, 2018, now Pat. No. 10,652,943, which is a continuation of application No. PCT/JP2017/017252, filed on May 2, 2017.

(51) Int. Cl.

| | |
|---|---|
| *H04M 15/00* | (2024.01) |
| *H04W 4/00* | (2018.01) |
| *H04W 4/24* | (2024.01) |
| *H04W 8/08* | (2009.01) |
| *H04W 36/00* | (2009.01) |
| *H04W 72/04* | (2023.01) |
| *H04W 76/14* | (2018.01) |
| *H04W 76/15* | (2018.01) |
| *H04W 76/27* | (2018.01) |
| *H04W 76/30* | (2018.01) |
| *H04W 88/06* | (2009.01) |
| *H04W 88/10* | (2009.01) |
| *H04W 88/14* | (2009.01) |

(52) U.S. Cl.
CPC ........ *H04L 12/1407* (2013.01); *H04M 15/66* (2013.01); *H04W 4/00* (2013.01); *H04W 4/24* (2013.01); *H04W 8/08* (2013.01); *H04W 36/0064* (2023.05); *H04W 36/0085* (2018.08); *H04W 72/04* (2013.01); *H04W 76/14* (2018.02); *H04W 76/15* (2018.02); *H04W 76/27* (2018.02); *H04W 76/30* (2018.02); *H04W 88/06* (2013.01); *H04W 88/10* (2013.01); *H04W 88/14* (2013.01)

(58) Field of Classification Search
CPC ..... H04W 60/04; H04W 72/04; H04W 76/14; H04W 76/15; H04W 76/16; H04W 76/27; H04W 76/30; H04W 8/08; H04W 8/24; H04W 88/06; H04W 88/10; H04W 88/14
See application file for complete search history.

(56) References Cited

U.S. PATENT DOCUMENTS

| | | | |
|---|---|---|---|
| 2015/0181473 A1 | 6/2015 | Horn et al. | |
| 2015/0326282 A1 | 11/2015 | Futaki | |
| 2015/0327107 A1 | 11/2015 | Kim et al. | |
| 2015/0334551 A1 | 11/2015 | Aminaka et al. | |
| 2015/0358879 A1 | 12/2015 | Diachina et al. | |
| 2015/0365993 A1 | 12/2015 | Aminaka et al. | |
| 2016/0029235 A1 | 1/2016 | Kim et al. | |
| 2016/0057687 A1 | 2/2016 | Horn | H04W 28/10 370/331 |
| 2016/0073247 A1 | 3/2016 | Liu et al. | |
| 2016/0174285 A1 | 6/2016 | Ke | H04W 8/06 370/329 |
| 2017/0014794 A1 | 1/2017 | Seul | |
| 2017/0201902 A1 | 7/2017 | Chen | H04W 28/0247 |
| 2017/0215065 A1 | 7/2017 | Vamanan et al. | |
| 2017/0215078 A1* | 7/2017 | Mochizuki | H04W 84/10 |
| 2018/0007212 A1 | 1/2018 | Sirotkin | H04M 15/66 |
| 2018/0020418 A1 | 1/2018 | Chandramouli et al. | |
| 2018/0227723 A1 | 8/2018 | Takahashi | H04M 15/8214 |
| 2018/0317118 A1 | 11/2018 | Jung | H04W 48/18 |
| 2018/0359797 A1 | 12/2018 | Dua | |

FOREIGN PATENT DOCUMENTS

| | | |
|---|---|---|
| EP | 3457783 A1 | 3/2019 |
| JP | 2013-45420 A | 3/2013 |
| JP | 2015-92718 A | 5/2015 |
| JP | 2015-164262 A | 9/2015 |
| RU | 2441347 C2 | 1/2012 |
| RU | 2447618 C2 | 4/2012 |
| RU | 2012123966 A | 12/2013 |
| WO | 2008/040448 A1 | 4/2008 |
| WO | 2012/096608 A1 | 7/2012 |
| WO | 2012/118740 A1 | 9/2012 |
| WO | WO-2014/168450 A1 | 10/2014 |
| WO | 2015/020475 A1 | 2/2015 |
| WO | WO-2015/136122 A1 | 9/2015 |
| WO | 2016/029962 A1 | 3/2016 |
| WO | 2017/092813 A1 | 6/2017 |

OTHER PUBLICATIONS

3GPP TS 23.401 V13.6.1 General Packet Radio Service (GPRS) enhancements for Evolved Universal Terrestrial Radio Access Network (E-UTRAN) access (Release 13) (Mar. 2016) (pp. 1-365).

3GPP TS 36.300 V13.3.0 Evolved Universal Terrestrial Radio Access (E-UTRA) and Evolved Universal Terrestrial Radio Access Network (E-UTRAN; Overall description; Stage 2 (Release 13) (Mar. 2016) (pp. 1-295).

3GPP TSG RAN Meeting #67 RP-150510 New WI Proposal: LTE-WLAN Radio Level Integration and Interworking Enhancement (Mar. 2015) (8 pages).

3GPP TSG-RAN WG3 Meeting #87 R3-150208 Alcatel-Lucent Shanghai Bell, Alcatel-Lucent, Requirements and solutions for supporting Hybrid HeNBs in dual connectivity (Feb. 2015) (3 Pages).

Ericsson "NR/LTE Tight Interworking: CP Requirements on Mobility and Dual Connectivity", 3GPP TSG-RAN WG2 #94, Tdoc R2-163993, Nanjing, China, May 23-27, 2016, pp. 1-5 (5 pages).

International Search Report corresponding to PCT/JP2017/017252 mailed Jun. 6, 2017 (2 pages).

Japanese Notice of Reasons for Refusal issued in Japanese Patent Application No. 2018-519169, dated Jan. 14, 2020, 8 pages.

Russian Official Action issued in Russian Patent Application No. 2018146113, dated Aug. 22, 2019, 11 pages.

Russian Decision to Grant issued in Russian Patent Application No. 2020102933/07(004567), dated May 26, 2020, 17 pages.

Russian Office Action for Russian Application No. 2020124584 dated Nov. 17, 2020 with English Translation.

Extended European Search Report for EP Application No. 21195388.0 dated on Nov. 23, 2021.

Japanese Office Action for JP Application No. 2020-167810 mailed on Jan. 4, 2022 with English Translation.

3GPP; TSG CN; Non-Access-Statum(NAS) protocol for Evolved Packet System(EPS); Stage3 (Release 13), 3GPP TS 24.301 V13. 5.0 (Mar. 2016), Mar. 18, 2016.

US Office Action for U.S. Appl. No. 17/088,028 mailed on Feb. 24, 2022.

JP Office Action for JP Application No. 2022-161321 , mailed on Sep. 26, 2023 with English Translation.

NEC,"Smarter Service requirement on charging for multi RAT connections", 3GPP TSG-SA WG1#71bis S1-153143, Oct. 21, 2015, pp. 1-pp. 4.

3Gpp, TSG-SA,TM, Charging management, Charging architecture and principles (Release 13), 3GPP TS 32.240 V13.1.0, Mar. 17, 2016, pp. 1-pp. 54.

* cited by examiner

| Bit | Description |
|-----|-------------|
| 0 | UTRAN Not Allowed |
| 1 | GERAN Not Allowed |
| 2 | GAN Not Allowed |
| 3 | I-HSPA-Evolution Not Allowed |
| 4 | WB-E-UTRAN Not Allowed |
| 5 | HO-To-Non-3GPP-Access Not Allowed |
| 6 | NB-IoT Not Allowed |
| 7 | 5G RAT Not Allowed |
| 8 | WB-E-UTRAN and WLAN DC Not Allowed |
| 9 | WB-E-UTRAN and Unlicensed WB-E-UTRAN DC Not Allowed |
| 10 | WB-E-UTRAN and 5G RAT DC Not Allowed |
| 11 | 5G RAT and WLAN DC Not Allowed |
| 12 | 5G RAT and Unlicensed 5G RAT DC Not Allowed |
| 13 | Any DC Not Allowed |

Fig. 11

COMMUNICATION SYSTEM, CONTROL DEVICE, COMMUNICATION TERMINAL, COMMUNICATION DEVICE, AND COMMUNICATION METHOD

CROSS-REFERENCE TO RELATED APPLICATIONS

This application is a continuation of U.S. patent application Ser. No. 18/132,665 filed on Apr. 10, 2023, which is a continuation of U.S. patent application Ser. No. 16/835,668 filed on Mar. 31, 2020, which issued as U.S. Pat. No. 11,659,610, which is a continuation of U.S. patent application Ser. No. 16/200,242 filed on Nov. 26, 2018, which issued as U.S. Pat. No. 10,652,943, which is a continuation of International Application No. PCT/JP2017/017252 filed on May 2, 2017, which claims priority to Japanese Patent Application No. 2016-105254 filed on May 26, 2016, the disclosures of which are hereby incorporated by reference in their entirety.

TECHNICAL FIELD

The present disclosure relates to a communication system, a control device, a communication terminal, a communication device and a communication method and, particularly, relates to a communication system, a control device, a communication terminal, a communication device and a communication method that perform communications using a plurality of radio bearers.

BACKGROUND ART

3GPP (3rd Generation Partnership Project), a standard specification for mobile communication systems, introduces dual connectivity as a technique for a communication terminal UE (User Equipment) to carry out wideband and low-delay communications. The dual connectivity is a technique that allows a UE to have dual connections to a first base station MeNB (Master evolved NodeB) and a second base station SeNB (Secondary eNB) that perform LTE (Long Term Evolution) communications, for example, so that the UE communicates not only with the MeNB but also with the SeNB. This improves the throughput of communications.

Non Patent Literature 1 describes, as a dual connectivity procedure, a process flow or the like where a UE newly adds an SeNB as an eNB to communicate with the UE when the UE is being connected with an MeNB.

On the other hand, areas where wireless LAN (Local Area Network) communications, which enable high-speed communications while the coverage area is smaller than mobile communication systems, are available have been expanded recently. Thus, a technique where a UE connects to both of an eNB that performs mobile communications and an access point AP that performs wireless LAN communications by applying the dual connectivity technology, and the UE communicates not only with the eNB but also with the AP has been also studied. To be more specific, the background, objective and the like of this study are described in Non Patent Literature 2.

Note that a charging rate to be applied to a UE is determined on the basis of a radio access technology (RAT) being used by the UE. For example, when a UE is performing LTE communications with an MeNB and an SeNB in dual connectivity, a charging rate determined at the time of LTE communications is applied to the UE. Non Patent Literature 3 describes a PCC (Policy and Charging Control) architecture for carrying out policy control and charging control.

Non Patent Literature 4 (TS23.401) describes that a gateway device PGW (Packet Date Network Gateway) manages RAT types on a UE-by-UE basis as parameters related to charging. The RAT type is a parameter indicating a RAT that is currently used by a UE.

CITATION LIST

Non Patent Literature

NPL1: 3GPP TS 36.300 V13.3.0 (2016 March) Section 5.7, Section 10.1.2.8
NPL2: 3GPP TSG RAN Meeting #67 (2015 March) RP-150510
NPL3: 3GPP TS 23.203 V13.7.0 (2016 March) Section 5, Section A.4.2
NPL4: 3GPP TS 23.401 V13.6.1 (2016 March) Section 5.7.4

SUMMARY OF INVENTION

Technical Problem

In the case of executing the dual connectivity described in Section 10.1.2.8 of Non Patent Literature 1, a UE performs communications by using one RAT which is common to the MeNB and the SeNB. In this case, a PGW manages RAT types as charging parameters on a UE-by-UE basis as described in Non Patent Literature 4. Thus, because the PGW uses the common RAT for communications between the UE and the MeNB and communications between the UE and the SeNB, it is not possible to distinguish between them. This causes a problem that it is not possible to apply different charging rates to communications between the UE and the MeNB and communications between the UE and the SeNB. In an example, as described in Section 5.7 of Non Patent Literature 1, there is a case where dual connectivity (Licensed-Assisted Access (LAA)) is made between communications using a spectrum licensed to a mobile operator and communications using a spectrum not licensed to a mobile operator. In such a case, different charging rates can be applied to those communications. However, when those communications are Dual Connectivity using the same RAT type, it is not possible to distinguish between those communications, and it is thereby not possible to apply different charging rates to them.

Further, as described in Non Patent Literature 2, there is a case where when a UE executes dual connectivity, the UE communicates with an eNB that performs mobile communications and an access point AP that performs wireless LAN communications. In this case, the UE performs communications using two types of RATs at the same time. Therefore, if a PGW manages RAT types on a UE-by-UE basis as described in Non Patent Literature 4, there is a possibility that a RAT type that is managed by the PGW and a RAT that is actually used by the UE are different. This causes a problem that, when a UE performs communications using two or more types of RATs, it is not possible to conduct adequate charging control (apply a charging rate) in accordance with actual communications.

An exemplary object of the present disclosure is to provide a communication system, a control device, a communication terminal, a communication device and a communication method capable of performing various processing related to a radio bearer to be used for communications by a communication terminal.

Solution to Problem

A communication system according to a first exemplary aspect of the present disclosure includes a communication terminal configured to communicate with a plurality of communication devices by using a different radio bearer for each of the plurality of communication devices, and a control device configured to determine whether to cause the communication device to measure traffic of each radio bearer.

A control device according to a second exemplary aspect of the present disclosure includes a control unit configured to determine, when a communication terminal communicates with a plurality of communication devices by using a different radio bearer for each of the plurality of communication devices, whether to cause at least one communication device of the plurality of communication devices to measure traffic of each radio bearer.

A communication terminal according to a third exemplary aspect of the present disclosure includes a transmitting unit configured to transmit, to a control device, support information indicating whether to be able to perform a plurality of communications by using a different radio bearer for each of a plurality of communication devices, a receiving unit configured to receive, from the control device, a determination result of determining whether the communication terminal communicates with a plurality of communication devices by using a plurality of radio bearers based on the support information and communication permission information indicating whether the communication terminal is allowed to communicate with a plurality of communication devices by using a plurality of radio bearers, and a control unit configured to perform processing of setting up a plurality of radio bearers with a plurality of communication devices when the determination result contains information instructing to communicate with a plurality of communication devices by using a plurality of radio bearers.

A communication method according to a fourth exemplary aspect of the present disclosure includes determining, when a communication terminal communicates with a plurality of communication devices by using a different radio bearer for each of the plurality of communication devices, whether to cause at least one communication device of the plurality of communication devices to measure traffic of each radio bearer, and transmitting a determination result to the communication device.

Advantageous Effects of Invention

According to the present disclosure, it is possible to provide a communication system, a control device, a communication terminal, a communication device and a communication method capable of performing various processing related to a radio bearer to be used for communications of a communication terminal.

BRIEF DESCRIPTION OF DRAWINGS

FIG. 11 is a view showing Access Restriction Data according to the second embodiment.

DESCRIPTION OF EMBODIMENTS

First Embodiment

Embodiments of the present disclosure are described hereinafter with reference to the drawings. A configuration example of a communication system according to a first embodiment of the present disclosure is described with reference to FIG. 1. The communication system in FIG. 1 includes a communication terminal 11, a communication device 12, a communication device 13, and a control device 14. The communication terminal 11, the communication device 12, the communication device 13, and the control device 14 may be a computer device that operates by running, on a processor, a program stored in a memory.

Figure 1:
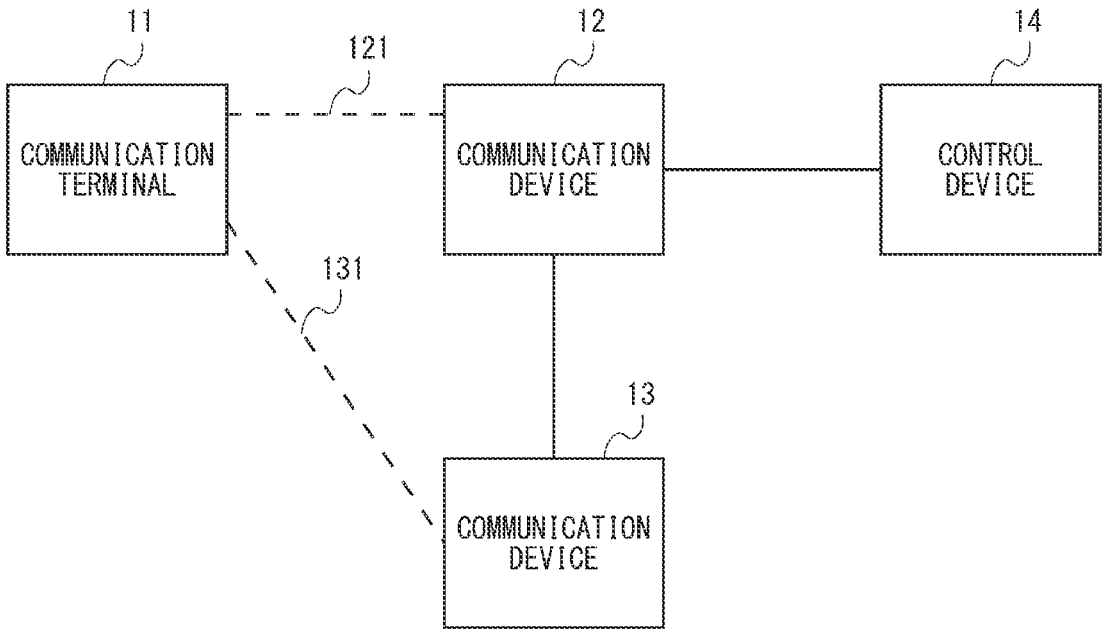
FIG. 1 is a schematic diagram of a communication system according to a first embodiment.

The communication terminal 11 is configured to communicate with a plurality of communication devices by using a different radio bearer for each of the plurality of communication devices. The communication terminal 11 may be a mobile phone terminal, a smartphone, a tablet terminal or the like. Further, the communication terminal 11 may be an M2M (Machine to Machine) terminal, an MTC (Machine Type Communication) terminal or the like. The radio bearer is a data communication path between, for example, the communication terminal 11 and the communication device 12 and between the communication terminal 11 and the communication device 13. The communication terminal 11 may set up a radio bearer between, for example, the communication device 12 and the communication device 13 as shown in FIG. 1. The dashed lines in FIG. 1 indicate radio bearers 121 and 131 that are set up between the communication terminal 11 and the communication device 12 and between the communication terminal 11 and the communication device 13, respectively.

The communication device 12 and the communication device 13 may be, for example, base stations used in mobile communications. Alternatively, the communication device 12 and the communication device 13 may be AP (Access Point) or WT (Wireless LAN Termination) used in wireless LAN communications. Further, the communication device 12 may be a base station, and the communication device 13 may be AP or WT (hereinafter referred to as WT as a representative one).

The communication terminal 11 may set up a plurality of radio bearers by using one RAT. For example, the communication terminal 11 may set up a plurality of radio bearers by using LTE as RAT. Alternatively, the communication terminal 11 may set up a plurality of radio bearers by using a plurality of RATs. For example, the communication terminal 11 may set up a plurality of radio bearers by using LTE and RAT that is defined as so-called 3G in 3GPP. Further, for example, the communication terminal 11 may set up a plurality of radio bearers by using a wireless communication scheme defined in 3GPP and wireless LAN.

The control device 14 is configured to determine whether or not to cause the communication device 12 to measure the traffic of each radio bearer. The control device 14 transmits an instruction signal that instructs measurement of the traffic of each radio bearer to, for example, the communication device 12. When the communication terminal 11 communicates with two or more communication devices, the control device 14 may transmit the instruction signal to the two or more communication devices which the communication terminal 11 communicates with. Alternatively, the control device 14 may transmit the instruction signal to the communication device 12, which serves as a representative of the two or more communication devices. The representative communication device 12 measures the traffic of the radio bearer 121 between the communication terminal 11 and the communication device 12, and may itself further measure the traffic of the radio bearer 131 between the communication terminal 11 and the communication device 13 or acquire it from the other communication device 13. To be specific, when the communications between the communication terminal 11 and the other communication device 13 are aggregated at the communication device 12 (in the case of aggregation), the communication device 12 measures, in addition to measuring the traffic of the radio bearer 121, the traffic of the radio bearer 131. Note that, even in this case, the communication device 12 may acquire the traffic of the radio bearer 131 measured in the communication device 13 from the communication device 13. On the other hand, when the communications between the communication terminal 11 and the communication device 13 are not aggregated at the communication device 12, the communication device 12 acquires the traffic of the radio bearer 131 measured in the communication device 13 from the communication device 13.

As described above, in the communication system of FIG. 1, the control device 14 determines whether or not to cause the communication device 12 to measure the traffic of each radio bearer. Further, the communication device 12 measures or acquires the traffic of each radio bearer according to a result of a determination in the control device 14. Therefore, when a telecommunications carrier carries out charging in accordance with the traffic of, for example, the communication terminal 11, it is possible to carry out charging in accordance with the traffic of each radio bearer.

For example, the communication device 12 measures the traffic of each radio bearer, and a telecommunications carrier can thereby set a different packet unit price for each radio bearer and carry out charging for each radio bearer.

Second Embodiment

Figure 2:
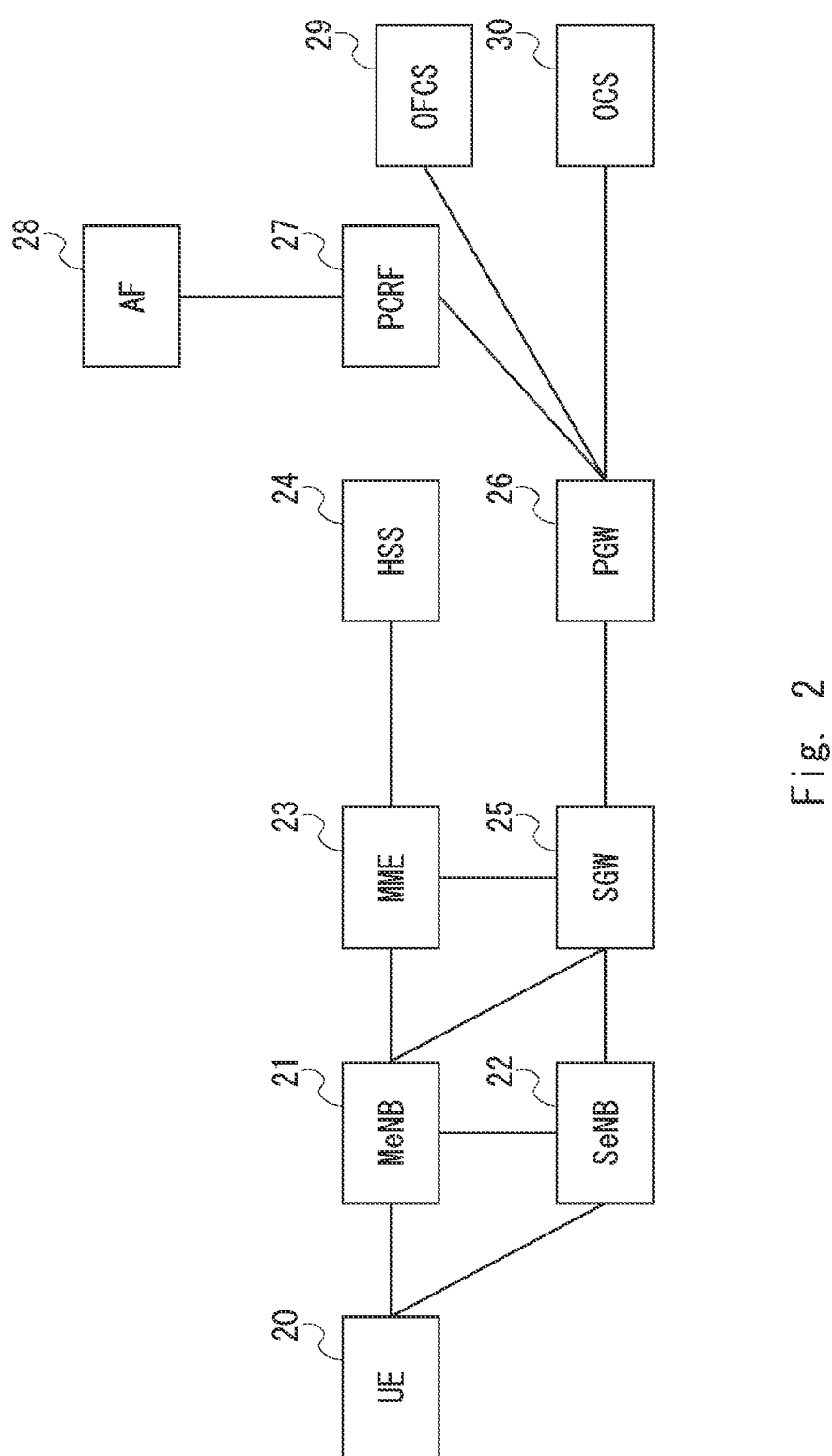
FIG. 2 is a schematic diagram of a communication system according to a second embodiment.

A configuration example of a communication system according to a second embodiment of the present disclosure is described with reference to FIG. 2. The communication system in FIG. 2 indicates a communication system defined in 3GPP. The communication system in FIG. 2 includes a UE 20, an MeNB 21, an SeNB 22, an MME (Mobility Management Entity) 23, an HSS (Home Subscriber Server) 24, an SGW (Serving Gateway) 25, a PGW 26, a PCRF (Policy and Charging Rule Function) entity 27 (which is referred to hereinafter as PCRF 27), an AF (Application Function) entity 28, (which is referred to hereinafter as AF 28), an OFCS (Offline Charging System) 29, and an OCS (Online Charging System) 30.

The UE 20 corresponds to the communication terminal 11 in FIG. 1. The UE 20 is used as a general term for communication terminals in 3GPP. The MeNB 21 corresponds to the communication device 12 in FIG. 1. The SeNB 22 corresponds to the communication device 13 in FIG. 1. The MeNB 21 and the SeNB 22 are base stations that are used when the UE 20 performs dual connectivity. The MME 23 corresponds to the control device 14 in FIG. 1. The MME 23 is a device that mainly makes mobility management of the UE 20, bearer setup request, bearer setup instruction, bearer deletion request or bearer deletion instruction.

The SGW 25 is a device that is connected to a radio access system and transfers user data between the radio access system and the PGW 26. The PGW 26 makes a connection to an external network (PDN: Packet Data Network etc.). The PCRF 27 determines policies (charging system) regarding QoS control, charging control or the like in the MeNB 21, the SeNB 22 and the PGW 26.

The AF 28 is a device that provides applications, and performs control related to application services to be provided to the UE 20. The OCS 30 and the OFCS 29 perform charging control or the like in accordance with a charging contract of the UE 20. For example, in the case of a charging contract such as a prepaid service, the OCS 30 having the ability to monitor the traffic at all times performs charging processing. On the other hand, in the case of a monthly charging contract or the like, the OFCS 2 performs charging processing.

Figure 3:
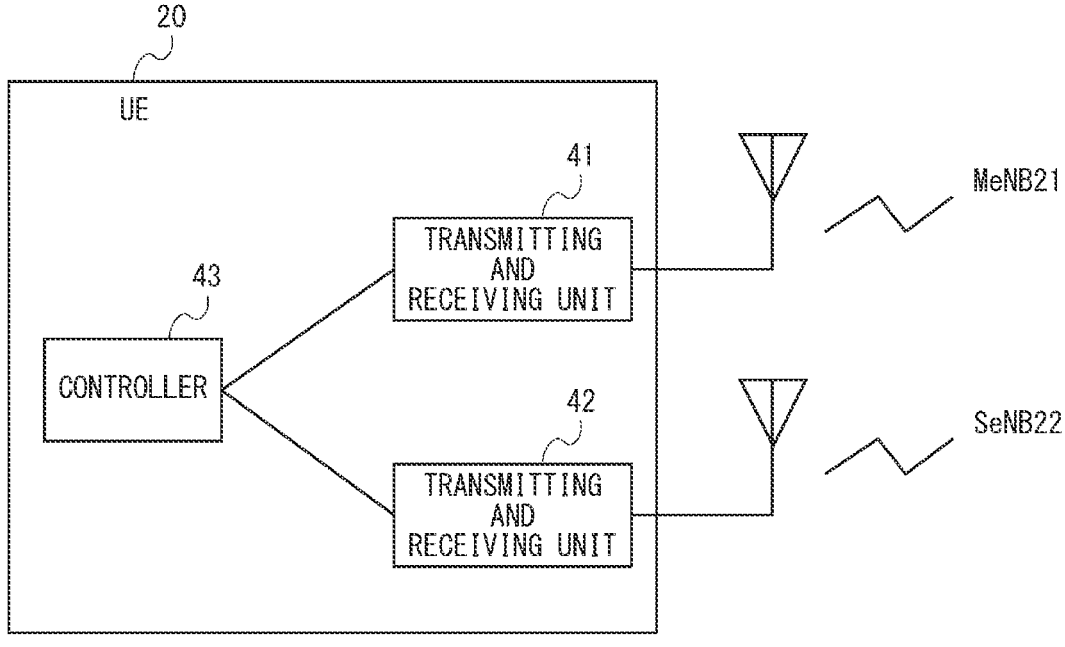
FIG. 3 is a schematic diagram of a UE according to the second embodiment.

A configuration example of the UE 20 according to the second embodiment of the present disclosure is described with reference to FIG. 3. The UE 20 includes a transmitting and receiving unit 41, a transmitting and receiving unit 42, and a controller 43. The components of the UE 20, such as the transmitting and receiving unit 41, the transmitting and receiving unit 42 and the controller 43, may be a module or software whose processing is executed by running, on a processor, a program stored in a memory. Alternatively, the components of the UE 20 may be hardware such as a chip or a circuit. The transmitting and receiving unit 41 and the transmitting and receiving unit 42 may be a transmitter and a receiver.

The transmitting and receiving unit 41 communicates with the MeNB 21. The transmitting and receiving unit 41 may perform radio communications with the MeNB 21 by using LTE specified as a radio communication scheme in 3GPP, for example. The transmitting and receiving unit 42 communicates with the SeNB 22. The transmitting and receiving unit 42 may also perform radio communications with the SeNB 22 by using LTE. Further, the transmitting and receiving unit 42 may communicate with a different communication device from the SeNB 22 by using a different radio communication scheme from LTE. For example, the transmitting and receiving unit 42 may communicate with a WT by using wireless LAN communications. In this case, the WT is a communication device that can communicate with the MeNB 21. In other words, the transmitting and receiving unit 42 communicates with the MeNB 21 through the SeNB 22 or the WT.

The controller 43 performs control to allocate transmission data to the transmitting and receiving unit 41 and the transmitting and receiving unit 42 when using dual connectivity. The controller 43 may further perform modulation of transmission data or the like. Further, the controller 43 may perform decoding of received data output from the transmitting and receiving unit 41 and the transmitting and receiving unit 42.

Figure 4:
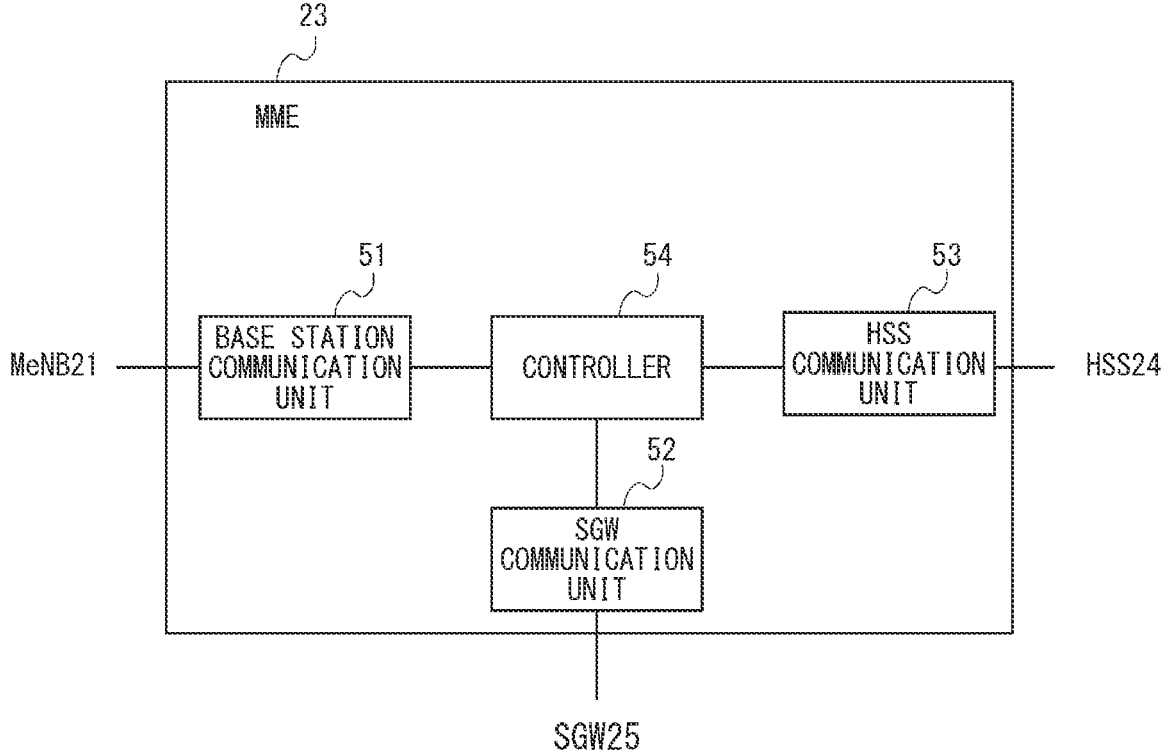
FIG. 4 is a schematic diagram of an MME according to the second embodiment.

A configuration example of the MME 23 according to the second embodiment of the present disclosure is described with reference to FIG. 4. The MME 23 includes a base station communication unit 51, an SGW communication unit 52, an HSS communication unit 53, and a controller 54. The components of the MME 23 may be a module or software whose processing is executed by running, on a processor, a program stored in a memory. Alternatively, the components of the MME 23 may be hardware such as a chip or a circuit. Note that the communication unit may be a transmitter and a receiver.

The base station communication unit 51 transmits and receives a control signal to and from the MeNB 21. A reference point between the base station communication unit 51 and the MeNB 21 is defined as S1-MME. Further, the base station communication unit 51 transmits and receives an NAS (Non Access Stratum) message with the UE 20 through the MeNB 21. The NAS message is transmitted between the base station communication unit 51 and the UE 20 through the MeNB 21.

The SGW communication unit 52 transmits and receives a control signal to and from the SGW 25. A reference point between the SGW communication unit 52 and the SGW 25 is defined as S11. The SGW communication unit 52 receives information about charging or the like transmitted from the PGW 26 through the SGW 25.

The HSS communication unit 53 transmits and receives a control signal to and from the HSS 24. A reference point between the HSS communication unit 53 and the HSS 24 is defined as S6a. The HSS communication unit 53 receives subscriber information regarding the UE 20 from the HSS 24. The subscriber information contains information as to whether or not to allow the UE 20 to perform or configure dual connectivity, for example.

The controller 54 determines whether or not to cause the MeNB 21 to perform dual connectivity by using the information transmitted from the MeNB 21 and the HSS 24. Further, when it is determined to cause the MeNB 21 to perform dual connectivity, the controller 54 determines whether or not to cause the MeNB 21 to measure the traffic of each radio bearer. The controller 54 transmits an instruction message indicating a determination result to the MeNB 21 through the base station communication unit 51. The instruction message may be a message that instructs the MeNB 21 to perform dual connectivity, for example. Further, the instruction message may be a message that instructs the MeNB 21 to measure the traffic of each radio bearer when performing dual connectivity. Furthermore, the controller 54 may transmit an instruction message to the PGW 26 through the SGW communication unit 52 and the SGW 25. By this instruction message, the PGW 26 is informed that dual connectivity is to be performed, and the traffic of each radio bearer is to be measured or acquired by the MeNB 21, and charging information regarding the traffic is to be received. The PGW 26 can thereby recognize that it does not need to measure the traffic after that. Further, the PGW 26 can make preparations for charging processing based on the received charging information.

Figure 5:
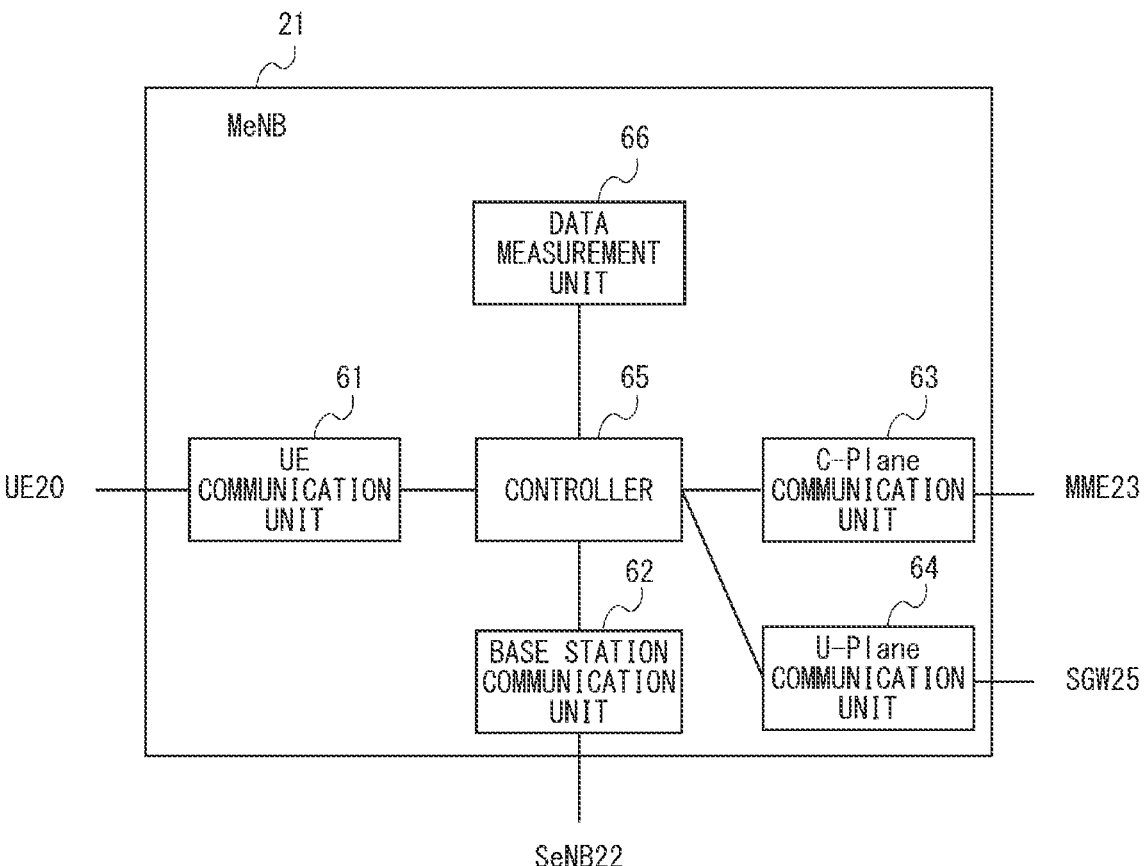
FIG. 5 is a schematic diagram of an MeNB according to the second embodiment.

A configuration example of the MeNB 21 according to the second embodiment of the present disclosure is described with reference to FIG. 5. The MeNB 21 includes a UE communication unit 61, a base station communication unit 62, a C-Plane communication unit 63, a U-Plane communication unit 64, a controller 65, and a data measurement unit 66. The components of the MeNB 21, such as the UE communication unit 61, the base station communication unit 62, the C-Plane communication unit 63, the U-Plane communication unit 64, the controller 65 and the data measurement unit 66 may be a module or software whose processing is executed by running, on a processor, a program stored in a memory. Alternatively, the components of the MeNB 21 may be hardware such as a chip or a circuit. Note that the communication unit may be a transmitter and a receiver.

The UE communication unit 61 transmits and receives data to and from the UE 20. A reference point between the UE communication unit 61 and the UE 20 is defined as LTE-Uu. The base station communication unit 62 transmits and receives data to and from the SeNB 22. A reference point between the base station communication unit 62 and the SeNB 22 is defined as X2.

The C-Plane communication unit 63 transmits and receives C (Control)-Plane data to and from the MME 23. The C-Plane data may be referred to also as a control signal. The U-Plane communication unit 64 transmits and receives U (User)-Plane data to and from the SGW 25. The U-Plane data may be referred to also as user data.

The controller 65 transmits information regarding dual connectivity to the MME 23 through the C-Plane communication unit 63. The information regarding dual connectivity may be information indicating whether or not the MeNB 21 can perform dual connectivity, for example. Further, the information regarding dual connectivity may be information about the SeNB that performs dual connectivity with the MeNB 21.

Further, when an instruction to perform dual connectivity is given from the MME 23, the controller 65 performs control to add the SeNB 22 through the base station communication unit 62. Furthermore, when an instruction to measure the traffic of each radio bearer is given from the MME 23, the controller 65 outputs a message to instruct measurement of the traffic of each radio bearer to the data measurement unit 66. The controller 65 further transmits a measurement result in the data measurement unit 66 to the MME 23 through the C-Plane communication unit 63.

When an instruction to measure the traffic of each radio bearer is given, the data measurement unit 66 measures the traffic between the UE 20 and the MeNB 21. When a plurality of radio bearers are set up with the UE 20, the data measurement unit 66 measures the traffic for each of the radio bearers. Further, the data measurement unit 66 acquires information about the traffic of each radio bearer between the UE 20 and the SeNB 22 from the SeNB 22 through the base station communication unit 62.

Figure 6:
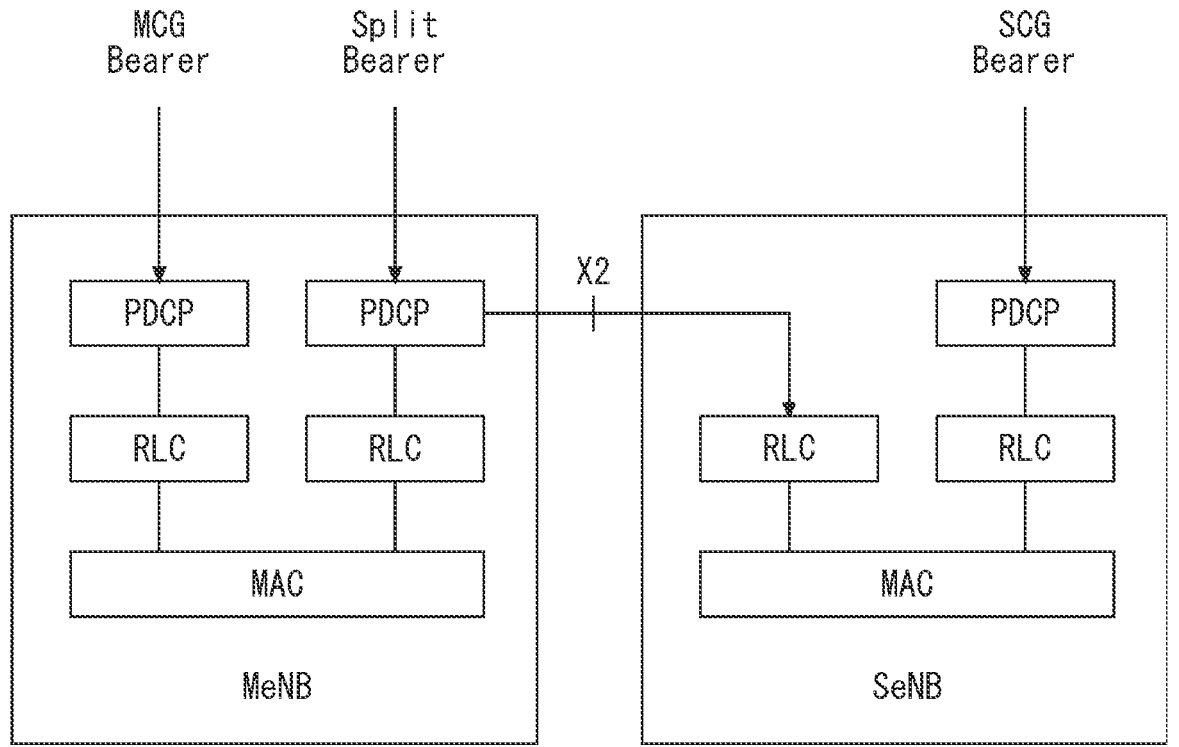
FIG. 6 is a view showing protocol stacks in the MeNB and an SeNB according to the second embodiment.

Protocol stacks in the MeNB 21 and the SeNB 22 are described hereinafter with reference to FIG. 6. The MeNB 21 and the SeNB 22 are composed of a MAC (Medium Access Control) layer, an RLC (Radio Link Control) layer, and a PDCP (Packet Data Convergence Protocol) layer. A radio bearer is set up between the PDCP layer of the UE 20 and the PDCP layer of the MeNB 21 or the SeNB 22.

The configuration of dual connectivity that is implemented in the MeNB 21 and the SeNB 22 is described hereinafter. There are two configurations for dual connectivity that is performed in the MeNB 21 and the SeNB 22: a configuration using an MCG (Master Cell Group) bearer and an SCG (Secondary Cell Group) bearer, and a configuration using a split bearer.

The MCG bearer is a communication bearer that is set up between the MeNB 21 and the SGW 25. The MCG bearer corresponds one-to-one to a radio bearer that is set up between the UE 20 and the MeNB 21. The SCG bearer is a communication bearer that is set up between the SeNB 22 and the SGW 25 or between the SeNB 22 and another SGW. Another SGW is a different SGW from the SGW 25. When implementing dual connectivity by using the MCG bearer and the SCG bearer, the SCG bearer corresponds one-to-one to a radio bearer that is set up between the UE 20 and the SeNB 22.

The split bearer is a communication bearer that is set up between the MeNB 21 and the SGW 25. The split bearer is associated with a radio bearer that is set up directly between the UE 20 and the MeNB 21. Further, the split bearer is associated with a radio bearer that is set up between the UE 20 and the MeNB 21 through the SeNB 22. In other words, the MeNB 21 transmits data transmitted through a radio bearer that is directly set up between the UE 20 and the MeNB 21 and data transmitted through a radio bearer that is set up between the UE 20 and the MeNB 21 through the SeNB 22 to the SGW 25 through the split bearer. The MeNB 21 receives data transmitted from the UE 20 to the SeNB 22 through the X2, which is a reference point between the MeNB 21 and the SeNB 22. The communications using the split bearer may be referred to as aggregation communications.

The flow of an S1 setup process between the MeNB 21 and the MME 23 is described hereinafter with reference to FIG. 7. First, the MeNB 21 is activated (S11). The MeNB 21 is activated by turning on the power, for example.

Next, the MeNB 21 transmits an S1 Setup Request message to the MME 23 (S12). The S1 Setup Request message contains DC Support, DC combination and DC Traffic Count Support Indication as parameters.

The DC Support is information indicating whether or not the MeNB 21 is able to configure dual connectivity. The DC combination is information indicating which device or which RAT the MeNB 21 configures dual connectivity with. For example, the MeNB 21 may configure dual connectivity with the SeNB 22. Alternatively, the MeNB 21 may configure dual connectivity with the WT that performs wireless LAN communications. Alternatively, the MeNB 21 may configure dual connectivity with a base station that performs communications using a radio communication scheme defined as 3G in 3GPP. Alternatively, the MeNB 21 may configure dual connectivity with a base station that performs communications using a radio communication scheme possibly defined as 5G in 3GPP in the future. The radio communication scheme defined as 5G may be a scheme that achieves high-speed communications using a wider bandwidth than LTE and shorter communication delay than LTE and the like.

The DC Traffic Count Support Indication is information indicating whether or not the MeNB 21 supports the function of measuring the traffic of each radio bearer. The traffic may be the amount of packets (which includes the number of packets, the data volume etc.; which are hereinafter referred to as the amount of packets as a representative). To measure the traffic of each radio bearer means, when the MeNB 21 configures dual connectivity by using the split bearer, to measure the data traffic transmitted and received directly between the MeNB 21 and the UE 20 and the data traffic transmitted and received between the MeNB 21 and the UE 20 through the SeNB 22 separately from each other. On the other hand, when the MeNB 21 configures dual connectivity by using the MCG bearer and the SCG bearer, to measure the traffic of each radio bearer means to measure the data traffic transmitted and received between the MeNB 21 and the UE 20 and the data traffic transmitted and received between the SeNB 22 and the UE 20 separately from each other.

Then, the MME 23 transmits an S1 Setup Response message to the MeNB 21 (S13). The S1 Setup Response message contains DC Traffic Count Support Indication as a parameter. The DC Traffic Count Support Indication contained in the S1 Setup Response message is information indicating whether or not the MME 23 can deal with counting the amount of packets for each radio bearer in the MeNB 21. For example, the DC Traffic Count Support Indication may be information indicating whether or not the MME 23 can transmit information about the amount of packets for each radio bearer received from the MeNB 21 as charging information to the PGW 26 through the SGW 25.

By performing the processing in Steps S12 and S13, the MeNB 21 and the MME 23 can exchange information about dual connectivity. In other words, by performing the processing in Steps S12 and S13, the MeNB 21 and the MME 23 can negotiate information about dual connectivity.

The flow of an X2 setup process between the MeNB 21 and the SeNB 22 is described hereinafter with reference to FIG. 8. The X2 setup process is a process performed after the MeNB 21 is activated.

First, the MeNB 21 transmits an X2 Setup Request message to the SeNB 22 (S21). The X2 Setup Request message contains the same parameters as those contained in the S1 Setup Request message in FIG. 7.

Next, the SeNB 22 transmits an X2 Setup Response message to the MeNB 21 (S22). The X2 Setup Response message contains DC Support, DC combination, and DC Traffic Count Support Indication as parameters. The DC Traffic Count Support Indication contained in the X2 Setup Response message is information indicating whether the SeNB 22 supports the function of counting the amount of packets for each radio bearer.

For example, the case where the MeNB 21 and the SeNB 22 configure dual connectivity and further the SeNB 22 supports the function of counting the amount of packets for each radio bearer is described below. In this case, the SeNB 22 transmits the amount of packets transmitted and received through the radio bearer associated with the SCG bearer to the MeNB 21.

By performing the processing in Steps S21 and S22, the MeNB 21 and the SeNB 22 can exchange information about dual connectivity. In other words, by performing the processing in Steps S21 and S22, the MeNB 21 and the SeNB 22 can negotiate information about dual connectivity.

Figure 8:
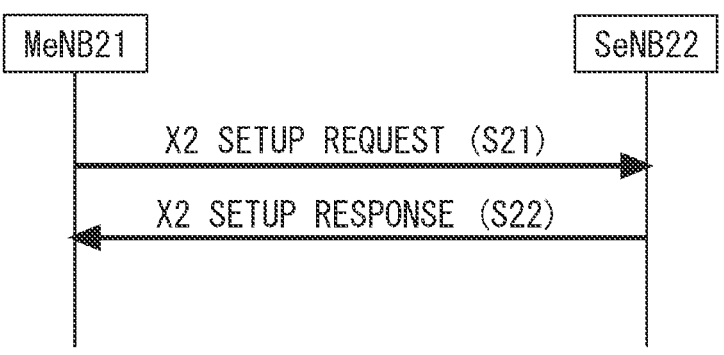
FIG. 8 is a view showing the flow of an X2 setup process according to the second embodiment.

Further, although an example in which the MeNB 21 transmits the X2 Setup Request message to the SeNB 22 is described in FIG. 8, the SeNB 22 may transmit the X2 Setup Request message to the MeNB 21.

The flow of an Attach process related to the UE 20 is described hereinafter with reference to FIGS. 9 and 10. The Attach process is a process performed for the UE 20 to transmit and receive data through a core network.

First, the UE 20 transmits an Attach request message to the MME 23 through the MeNB 21 (S31). The Attach request message contains DC Support and DC combination as parameters. The DC Support contained in the Attach request message is information indicating whether or not the UE 20 is able to configure dual connectivity. Thus, the DC Support contained in the Attach request message is information indicating whether or not the UE 20 can perform communications using a plurality of radio bearers at the same time. Further, the DC combination contained in the Attach request message is information indicating a combination of RATs which the UE 20 uses to configure dual connectivity. The UE 20 may configure dual connectivity by combining the same RATs or may configure dual connectivity by combining different RATs.

Then, the MME 23 transmits an Update Location request message to the HSS 24 (S32). The HSS 24 then transmits an Update Location Ack message to the MME 23 (S33). The Update Location Ack message contains Access Restriction Data and DC not allowed as parameters. The Access Restriction Data and DC not allowed are managed in the HSS 24 as subscriber information of the UE 20.

The DC Not Allowed is information indicating whether the UE 20 is allowed to configure dual connectivity. For example, the DC Not Allowed information may be used as flag information. To be specific, when "1" is set to the DC Not Allowed, it indicates that the UE 20 is allowed to configure dual connectivity, and when "0" is set to the DC Not Allowed, it indicates that the UE 20 is not allowed to configure dual connectivity.

The Access Restriction Data is information indicating RAT which the UE 20 cannot use. The Access Restriction Data is described hereinafter with reference to FIG. 11. FIG. 11 shows that a bit position that is set to the Access Restriction Data and a RAT whose usage is restricted are associated with each other. For example, when 1 is set to the 0th bit of the Access Restriction Data, the UE cannot use UTRAN. Further, when 1 is set to the 7th bit of the Access Restriction Data, the UE cannot use the radio communication scheme defined as 5G.

Referring back to FIG. 9, the MME 23 then determines whether or not to cause the MeNB 21 to count the amount of packets for each radio bearer based on DC Support transmitted from the MeNB 21 and the UE 20 and DC Traffic Count Support Indication transmitted from the MeNB 21 (S34). For example, when the MeNB 21 and the UE 20 are able to configure dual connectivity and the MeNB 21 supports the function of counting the amount of packets for each radio bearer, the MME 23 determines to cause the MeNB 21 to count the amount of packets for each radio bearer. For example, when any one of the MeNB 21 and the UE 20 is not able to configure dual connectivity or when the MeNB 21 does not support the function of counting the amount of packets for each radio bearer, the MME 23 determines not to cause the MeNB 21 to count the amount of packets for each radio bearer.

Further, in Step S34, when the DC Not Allowed transmitted from the HSS 24 indicates that the UE 20 is not allowed to configure dual connectivity, the MME 23 may determine not to cause the MeNB 21 to count the amount of packets for each radio bearer. Further, in Step S34, when the Access Restriction Data transmitted from the HSS 24 indicates that usage of the RAT indicated by the DC combination transmitted from the UE 20 and the MeNB 21 is restricted, the MME 23 may determine not to cause the MeNB 21 to count the amount of packets for each radio bearer.

Then, the MME 23 transmits a Create Session Request message to the SGW 25 (S35). The MME 23 sets DC Traffic Count Support Indication indicating a determination result in Step S34 to the Create Session Request message. Alternatively, when the MME 23 determines not to cause the MeNB 21 to count the amount of packets for each radio bearer in Step S34, the MME 23 may refrain from setting DC Traffic Count Support Indication to the Create Session Request message.

Then, the SGW 25 transmits the Create Session Request message received in Step S35 to the PGW 26 (S36). The PGW 26 then performs QoS negotiation regarding the communication quality of the UE 20 with the PCRF 27 (S37).

Then, the PGW 26 transmits a Create Session Response message to the SGW 25 (S38). The Create Session Response message contains DC Traffic Count Support Indication, Count Rule, and DC Not Allowed as parameters. The DC Traffic Count Support Indication contained in the Create Session Response message is information indicating whether or not the PGW 26 can output information about the amount of packets for each radio bearer transmitted from the MeNB 21 as charging information to the OFCS 29 and the OCS 30.

The DC Not Allowed contained in the Create Session Response message is information indicating whether or not to allow the UE 20 to configure dual connectivity. For example, the PGW 26 may set whether or not to allow the UE 20 to configure dual connectivity in accordance with APN (Access Point Name) to which the UE 20 connects. In other words, whether or not to allow configuration of dual connectivity may be predetermined for each APN to which the UE 20 connects. The Count Rule contained in the Create Session Response message is information indicating detailed conditions when the MeNB 21 counts the amount of packets for each radio bearer. For example, the Count Rule may contain at least one of RAT type of the RAT to be counted, Traffic type of the traffic to be counted, and Report period indicating the period of counting.

The case where LTE is designated as the RAT type, for example, is described hereinafter. In this case, when configuring dual connectivity by using LTE and wireless LAN communications, the MeNB 21 counts only the number of packets transmitted and received in LTE. On the other hand, when configuring dual connectivity with the SeNB 22 that performs LTE communications, the MeNB 21 counts the total amount of packets transmitted and received for each radio bearer.

The Traffic type indicates counting downlink user data only, counting uplink user data only, counting both of downlink user data and uplink user data or the like. For the Report period, a time interval such as hourly may be designated, or the start time and end time of counting the amount of packets may be indicated, for example.

After that, the SGW 25 transmits the Create Session Response message received in Step S38 to the MME 23 (S39). The MME 23 determines whether or not to activate dual connectivity, that is, whether or not to configure dual connectivity, in the UE 20, the MeNB 21 and the SeNB 22 by using the Access Restriction Data and the DC Not Allowed transmitted from the HSS 24 and the DC Not Allowed received from the PGW 26 (S40). For example, when any one of the Access Restriction Data and the DC Not Allowed transmitted from the HSS 24 and the DC Not Allowed transmitted from the PGW 26 indicates not to allow the UE 20 to configure dual connectivity, the MME 23 may determine to inactivate dual connectivity in the UE 20, the MeNB 21 and the SeNB 22.

Figure 10:
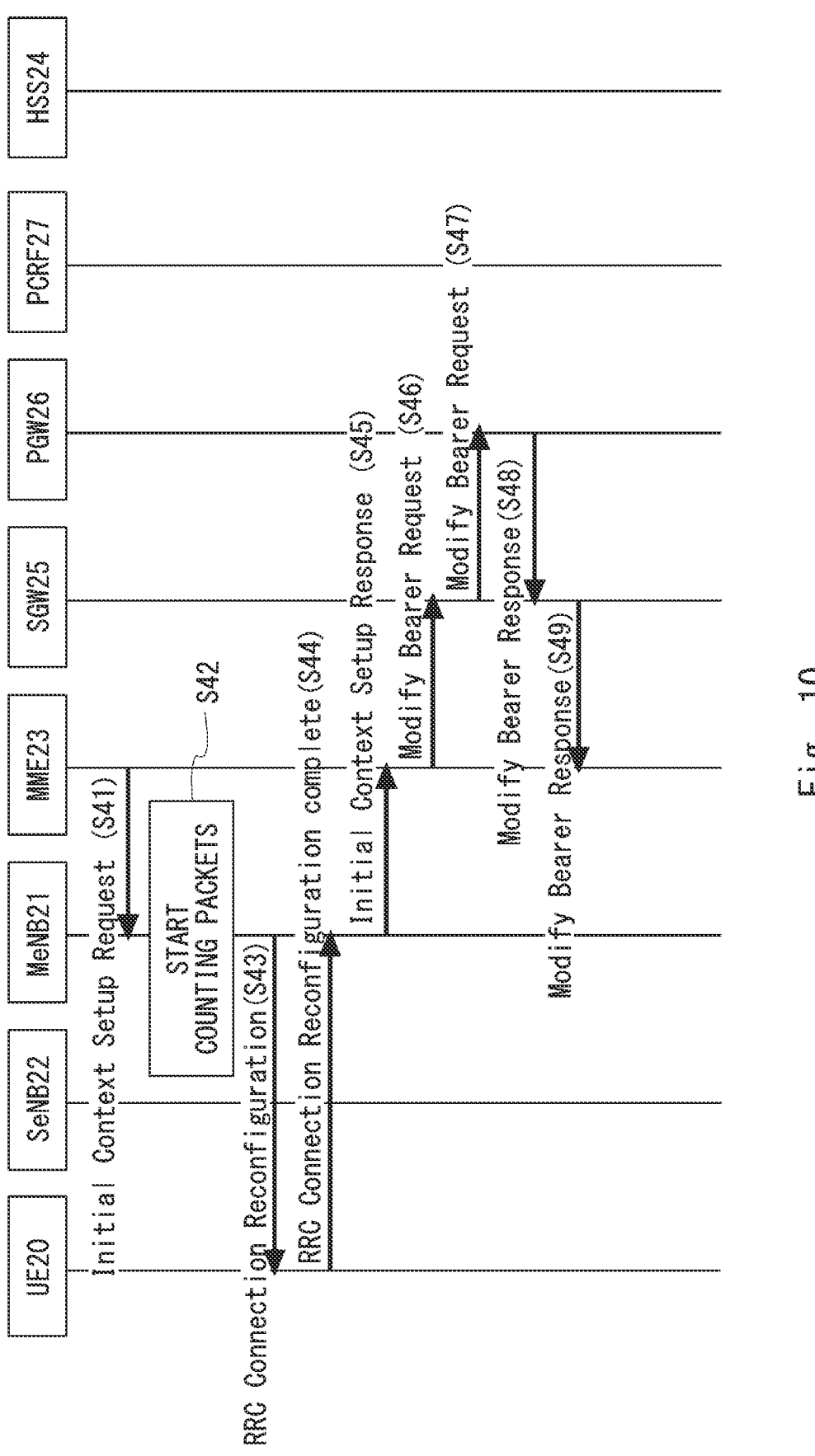
FIG. 10 is a view showing the flow of the Attach process according to the second embodiment.

Referring to FIG. 10, the MME 23 transmits an Initial Context Setup message containing an ATTACH Accept message to the MeNB 21 (S41). The ATTACH Accept message is transmitted to the UE 20 through the MeNB 21.

The ATTACH Accept message contains DC Not Allowed as a parameter. The DC Not Allowed contained in the ATTACH Accept message is information indicating whether or not to allow the UE 20 to configure dual connectivity. The Initial Context Setup message contains DC Traffic Count Support Indication, Count Rule and DC Not Allowed as parameters, in addition to the ATTACH Accept message. The DC Not Allowed contained in the Initial Context Setup message is information indicating whether or not to allow the MeNB 21 to configure dual connectivity. When the DC Not Allowed indicates to allow the MeNB 21 to configure dual connectivity, the MME 23 instructs the MeNB 21 whether or not to count the amount of packets for each radio bearer by DC Traffic Count Support Indication.

When it is indicated to allow configuration of dual connectivity and instructed to count the amount of packets for each radio bearer by the Initial Context Setup message received in Step S41, the MeNB 21 starts counting the amount of packets in accordance with the Count Rule (S42). Further, the MeNB 21 may receive the amount of packets counted in the SeNB 22 from the SeNB 22.

Then, the MeNB 21 transmits an RRC Connection Reconfiguration message containing an ATTACH Accept message to the UE 20 (S43). The ATTACH Accept message contained in the RRC Connection Reconfiguration message is the same as the ATTACH Accept message contained in the Initial Context Setup message. The RRC Connection Reconfiguration message contains DC Not Allowed as a parameter, in addition to the ATTACH Accept message.

After that, the UE 20 transmits an RRC Connection Reconfiguration Complete message to the MeNB 21 (S44). The MeNB 21 then transmits an Initial Context Setup Response message to the MME 23 (S45). The Initial Context Setup Response message contains DC Charging Activated as a parameter. The DC Charging Activated is used to notify that the operation of counting the amount of packets for each radio bearer is started in the MeNB 21.

The MME 23 then transmits a Modify Bearer Request message to the SGW 25 (S46). The Modify Bearer Request message contains the DC Charging Activated acquired in Step S45. Then, the SGW 25 transmits the Modify Bearer Request message to the PGW 26 (S47). The Modify Bearer Request message contains the DC Charging Activated acquired in Step S46.

Before acquiring the DC Charging Activated, the PGW 26 counts the amount of packets transmitted and received for each UE. After acquiring the DC Charging Activated, the PGW 26 may stop counting the amount of packets transmitted and received for each UE in order to recognize that the amount of packets for each radio bearer is counted in the MeNB 21. Alternatively, the PGW 26 may continue to count the amount of packets transmitted and received for each UE even after acquiring the DC Charging Activated.

After that, the PGW 26 transmits a Modify Bearer Response message to the SGW 25 (S48). The SGW 25 then transmits a Modify Bearer Response message to the MME 23 (S49).

The flow of a process where the MeNB 21 reports the amount of packets counted for each radio bearer related to the UE 20 is described hereinafter with reference to FIG. 12. First, the MeNB 21 transmits a Traffic Count Report Request message to the SeNB 22 in order to acquire information about the amount of packets counted in the SeNB 22 in accordance with the Count Rule (S51). For example, the MeNB 21 may transmit the Traffic Count Report Request message to the SeNB 22 when the count period specified in the Count Rule expires. Alternatively, the MeNB 21 may transmit the Traffic Count Report Request message to the SeNB 22 at arbitrary timing.

Then, the SeNB 22 transmits a Traffic Count Report message to the MeNB 21 (S52). The Traffic Count Report message contains Traffic Data as a parameter. The Traffic Data is information about the amount of packets counted for each radio bearer in the SeNB 22. To be specific, the Traffic Data may contain RAT type indicating the counted RAT, Measured Traffic indicating the counted amount of packets, and Measured Period indicating the counted period.

The Measured Traffic may indicate the amount of packets in downlink user data and the amount of packets in uplink user data separately from each other. Further, the Measured Period may indicate the time when counting is started and the time when counting is ended, for example.

Then, the MeNB 21 transmits an E-RAB Modification Indication message to the MME 23 (S53). The E-RAB Modification Indication message contains Traffic Data acquired by the MeNB 21 from the SeNB 22, and Traffic Data which is information about the amount of packets counted in the MeNB 21.

The MME 23 then transmits a Modify Bearer Request message to the SGW 25 (S54). The Modify Bearer Request message contains the same Traffic Data as the Traffic Data contained in the E-RAB Modification Indication. The SGW 25 then transmits a Modify Bearer Request message to the PGW 26 (S55). The Traffic Data contained in the Modify Bearer Request message in Step S55 is the same as the Traffic Data contained in the Modify Bearer Request message in Step S54.

Then, the PGW 26 transmits a Modify Bearer Response message to the SGW 25 (S56). The SGW 25 then transmits a Modify Bearer Response message to the MME 23 (S57). The MME 23 then transmits an E-RAB Modification Confirm message to the MeNB 21 (S58).

The PGW 26 receives information about the amount of packets counted for each radio bearer in the MeNB 21 and the SeNB 22 that configure dual connectivity in Step S55. The PGW 26 thereby generates a counting ticket (CDR) in accordance with the amount of packets counted for each radio bearer and transmits the generated counting ticket to the OFCS 29 or the OCS 30. The OFCS 29 or the OCS 30 may calculate the charge by multiplying the amount of packets counted for each radio bearer by the charging rate set for each radio bearer, for example. For example, the rate may be set higher for the RAT using LTE or mobile communications such as 5G than for the RAT using wireless LAN communications.

Figure 12:
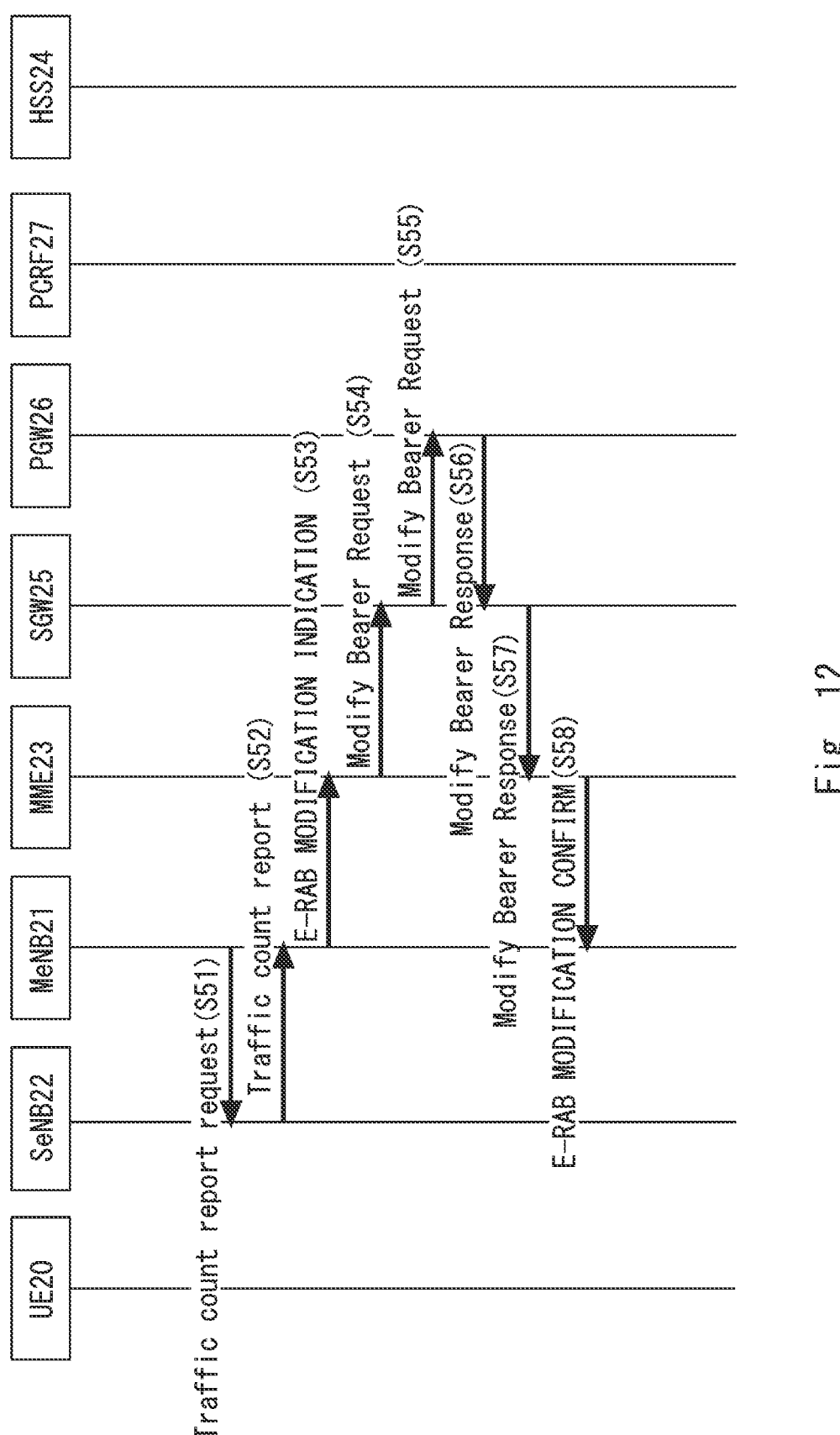
FIG. 12 is a view showing the flow of a process for the MeNB to report the amount of packets counted for each radio bearer related to the UE according to the second embodiment.

FIG. 12 shows a process where the MeNB 21 transmits a Traffic Count Report Request message to the SeNB 22 in order to request transmission of Traffic Data in Step S51. On the other hand, the SeNB 22 may autonomously transmit a Traffic Count Report message to the MeNB 21 in accordance with the Count Rule without receiving a Traffic Count Report Request message. For example, the SeNB 22 may transmit a Traffic Count Report message to the MeNB 21 at the timing when the Report period indicated by the Count Rule expires.

Further, a message used for transmitting Traffic Data is not limited to the message shown in FIG. 12. The messages after Step S53 shown in FIG. 12 are the messages defined in 3GPP. For example, a new message that is not currently defined in 3GPP may be used as a message after Step S53. For example, a new message of a Traffic Report Indication message may be used instead of the E-RAB Modification Indication message. Further, a new message of a Traffic Report Confirm Message may be used instead of the E-RAB Modification Confirm message. Furthermore, a new message of a Traffic Report Request message may be used instead of the Modify Bearer Request message. A new message of a Traffic Report Response message may be used instead of the Modify Bearer Response message.

As described above, by using the communication system according to the second embodiment of the present disclosure, the MeNB 21 can count the amount of packets transmitted and received for each radio bearer. Further, the PGW 26 can generate charging information by using information about the amount of packets counted in the MeNB 21. The PGW 26 can thereby carry out charging for each radio bearer even when dual connectivity is formed in the MeNB 21 and the SeNB 22.

Further, the HSS 24 holds, as subscriber information of the UE 20, information about whether or not to allow configuration of dual connectivity and information about RAT whose usage is restricted in dual connectivity. This prevents the UE 20 from configuring dual connectivity by using the RAT not allowed by the subscriber information. For example, the case where the UE 20 has an inexpensive contract where the available RAT is restricted to 2G and 3G is described. In such a case, it is possible to prevent the UE 20 from using the RAT such as 5G, which is available by making an expensive contract, when configuring dual connectivity.

Third Embodiment

The flow of a multiple PDN connectivity establishment process according to a third embodiment of the present disclosure is described with reference to FIGS. 13 and 14.

Figure 13:
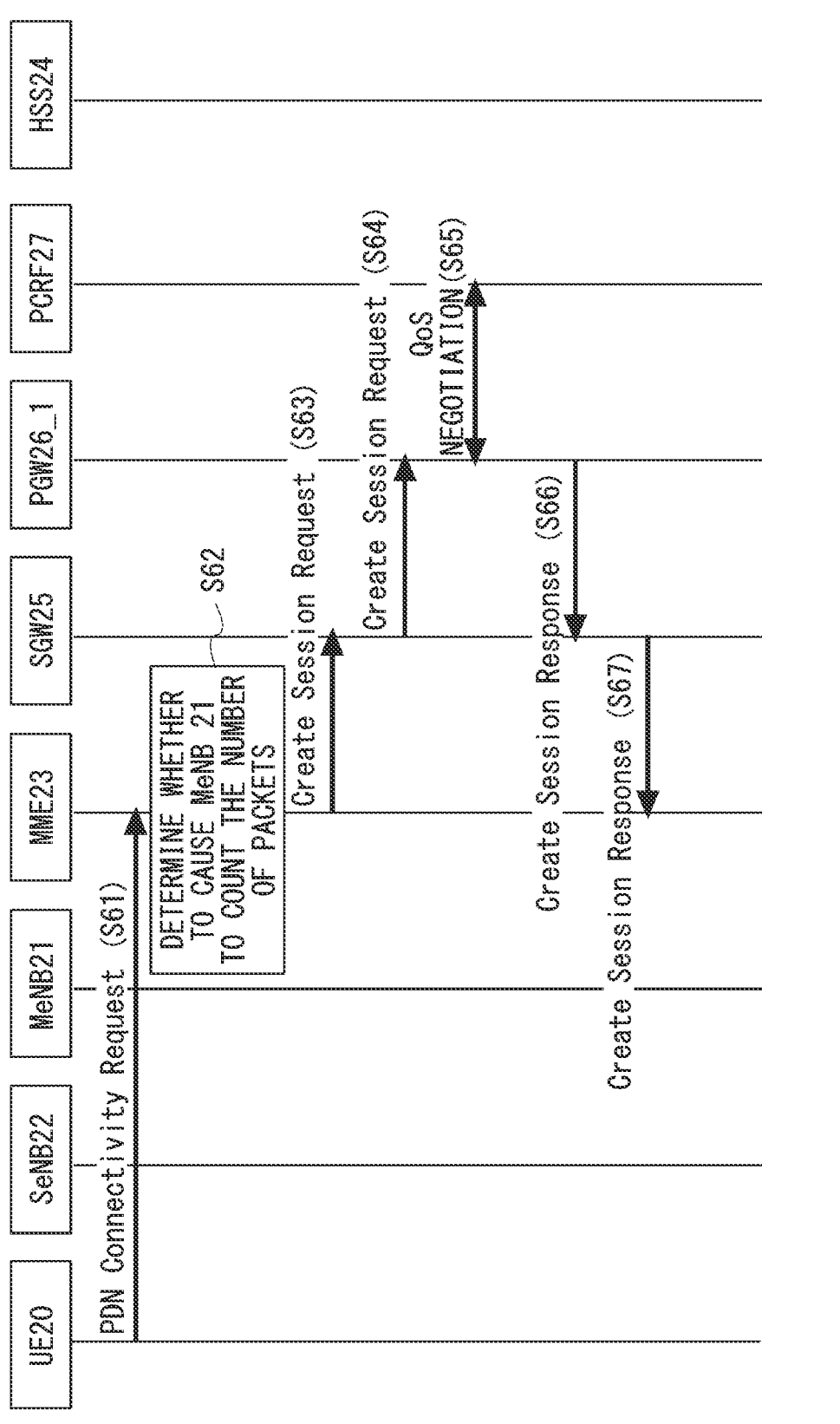
FIG. 13 is a view showing the flow of a multiple PDN connectivity establishment process according to a third embodiment.
Figure 14:
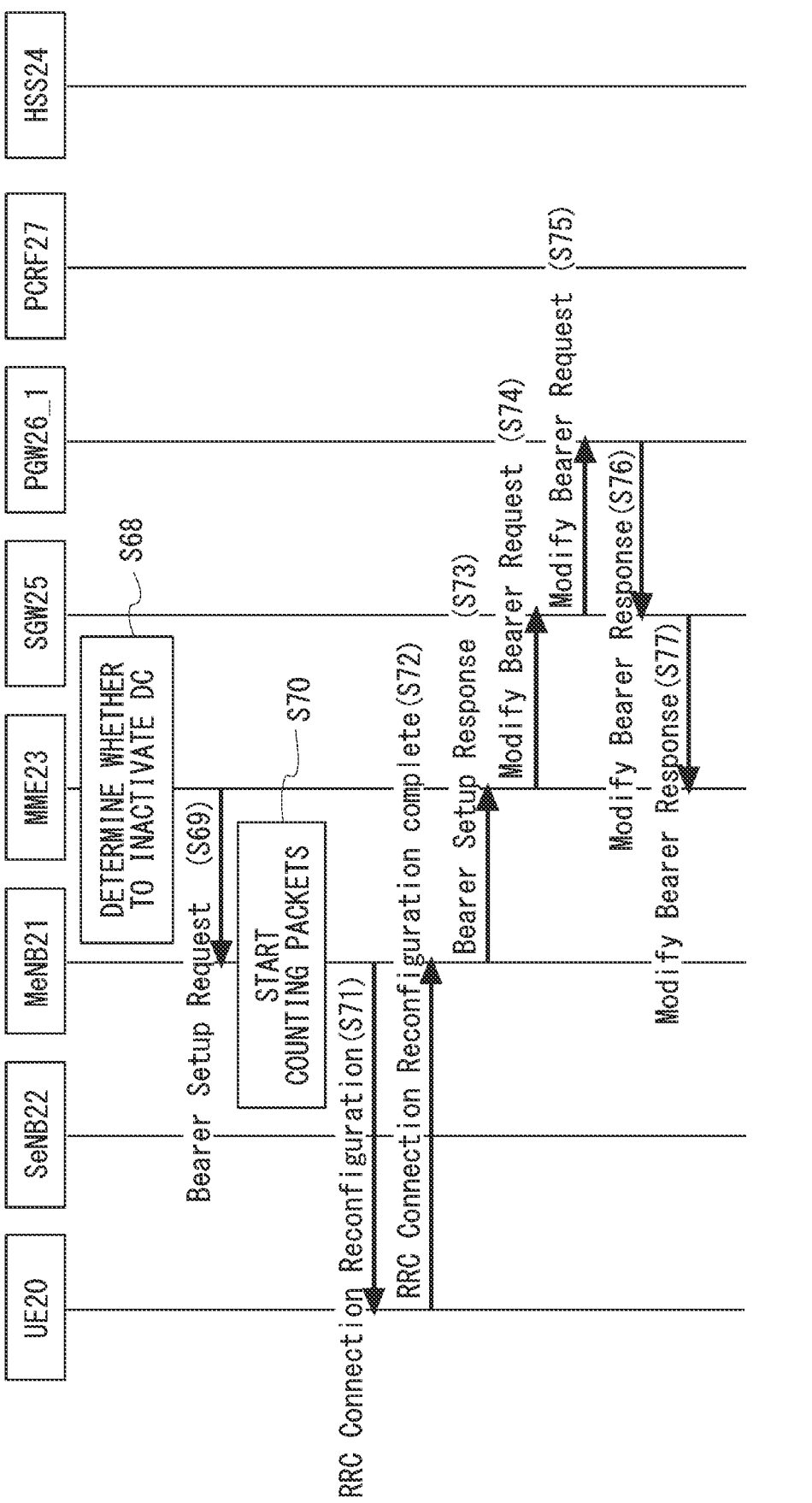
FIG. 14 is a view showing the flow of the multiple PDN connectivity establishment process according to the third embodiment.

FIGS. 13 and 14 show the flow of a process when the UE 20 connects to a plurality of PDNs. It is assumed that, before the process of FIG. 13 is performed, the process of FIGS. 9 and 10 has been performed and the UE 20 has established PDN connectivity with the PGW 26.

First, the UE 20 transmits a PDN Connectivity Request message to the MME 23 through the MeNB 21 (S61). The PDN Connectivity Request message contains APN, which is information that identifies PDN which the UE 20 connects to.

Figure 7:
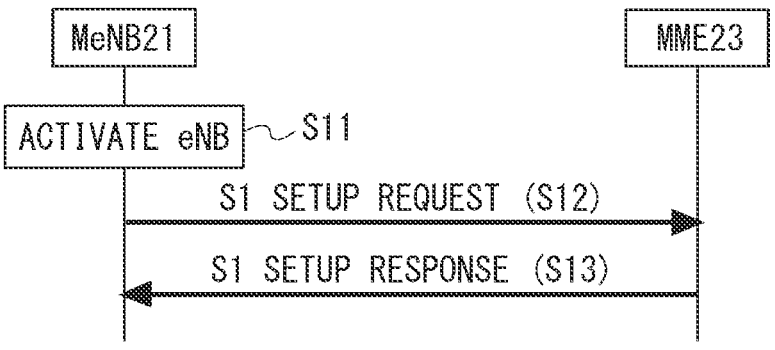
FIG. 7 is a view showing the flow of an S1 setup process according to the second embodiment.

Next, the MME 23 determines whether or not to cause the MeNB 21 to count the amount of packets for each radio bearer regarding data through newly established PDN connectivity by using the information acquired in the S1 Setup process in FIG. 7, the X2 Setup process in FIG. 8, and the Attach process in FIG. 10 (S62). The information acquired in the Attach process contains Access Restriction Data related to the UE 20 and DC Not Allowed related to the UE 20 acquired from the HSS 24, for example. Further, the information acquired in the S1 Setup process, the X2 Setup process and the Attach process contains DC Support transmitted from the MeNB 21 and the UE 20 and DC Traffic Count Support Indication transmitted from the MeNB 21.

Figure 9:
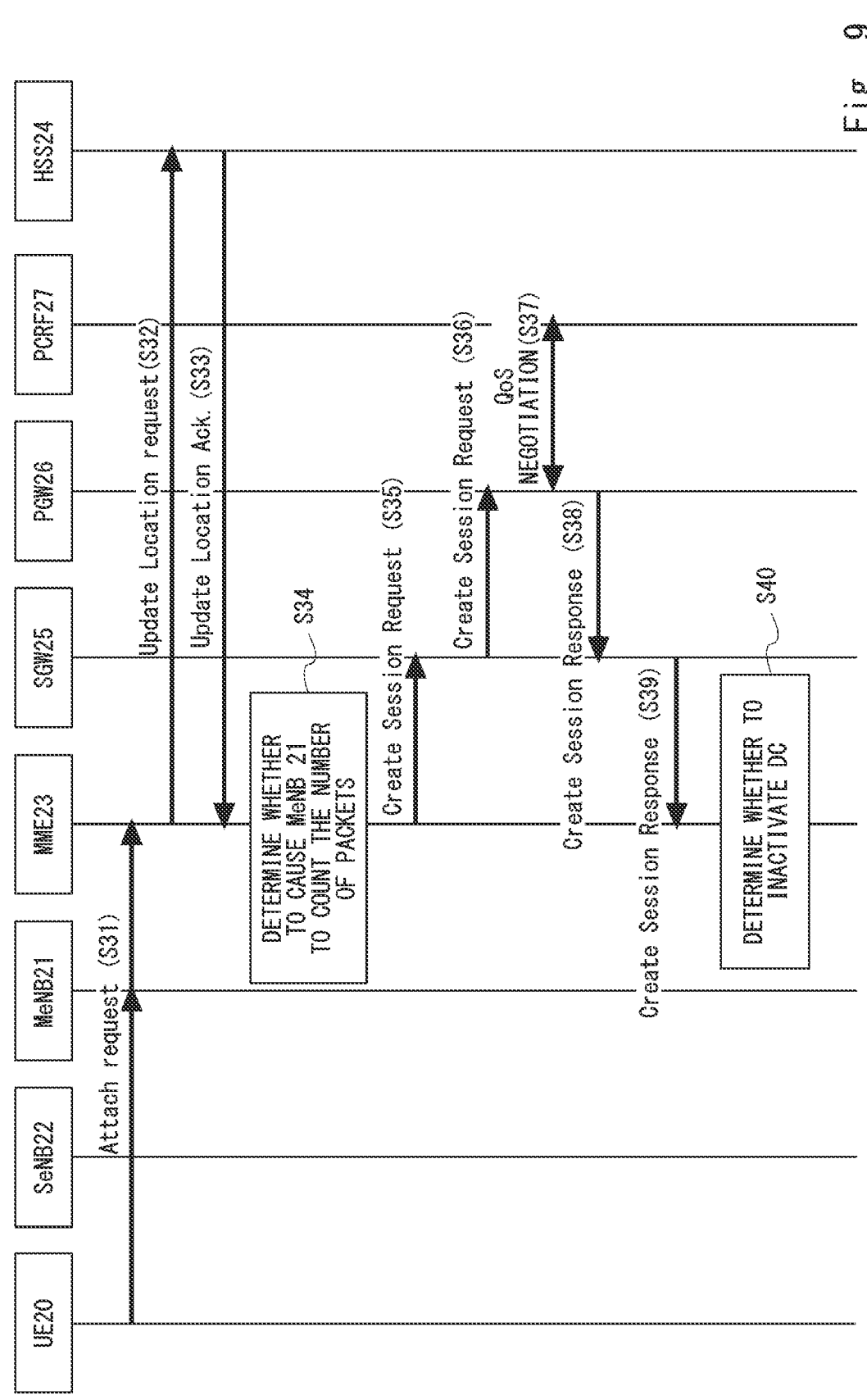
FIG. 9 is a view showing the flow of an Attach process according to the second embodiment.

Step S63 in FIG. 13 to Step S68 in FIG. 14 are the same as Steps S35 to S40 in FIG. 9 and the detailed description thereof is omitted. Note that, however, the SGW 25 transmits and receives a Create Session Request message and a Create Session Response message with a PGW 26_1, which is different from the PGW 26, in FIGS. 13 and 14.

Next, the MME 23 transmits a Bearer Setup Request message containing a PDN Connectivity Accept message to the MeNB 21 (S69). The PDN Connectivity Accept message is transmitted to the UE 20 through the MeNB 21.

The PDN Connectivity Accept message contains DC Not Allowed as a parameter. The DC Not Allowed contained in the PDN Connectivity Accept message is information indicating whether or not to allow the UE 20 to configure dual connectivity. The Bearer Setup Request message contains DC Traffic Count Support Indication, Count Rule and DC Not Allowed as parameters, in addition to the PDN Connectivity Accept message. The DC Not Allowed contained in the Bearer Setup Request message is information indicating whether or not to allow the MeNB 21 to configure dual connectivity. When the DC Not Allowed indicates to allow the MeNB 21 to configure dual connectivity, the MME 23 instructs the MeNB 21 to count the amount of packets for each radio bearer by DC Traffic Count Support Indication.

Steps S70 to S77 are the same as Steps S42 to S49 in FIG. 10 and the detailed description thereof is omitted. Note that, however, the RRC Connection Reconfiguration message in Step S71 contains a PDN Connectivity Accept message, instead of the ATTACH Accept message. Further, in Step S73, a Bearer Setup Response message is transmitted instead of the Initial Context Setup Response message in Step S45 in FIG. 10.

As described above, by performing the PDN connectivity establishment process in FIGS. 13 and 14, it is possible to determine, for each PDN connectivity, whether or not to cause an eNB to count the amount of packets for each radio bearer.

Fourth Embodiment

Figure 15:
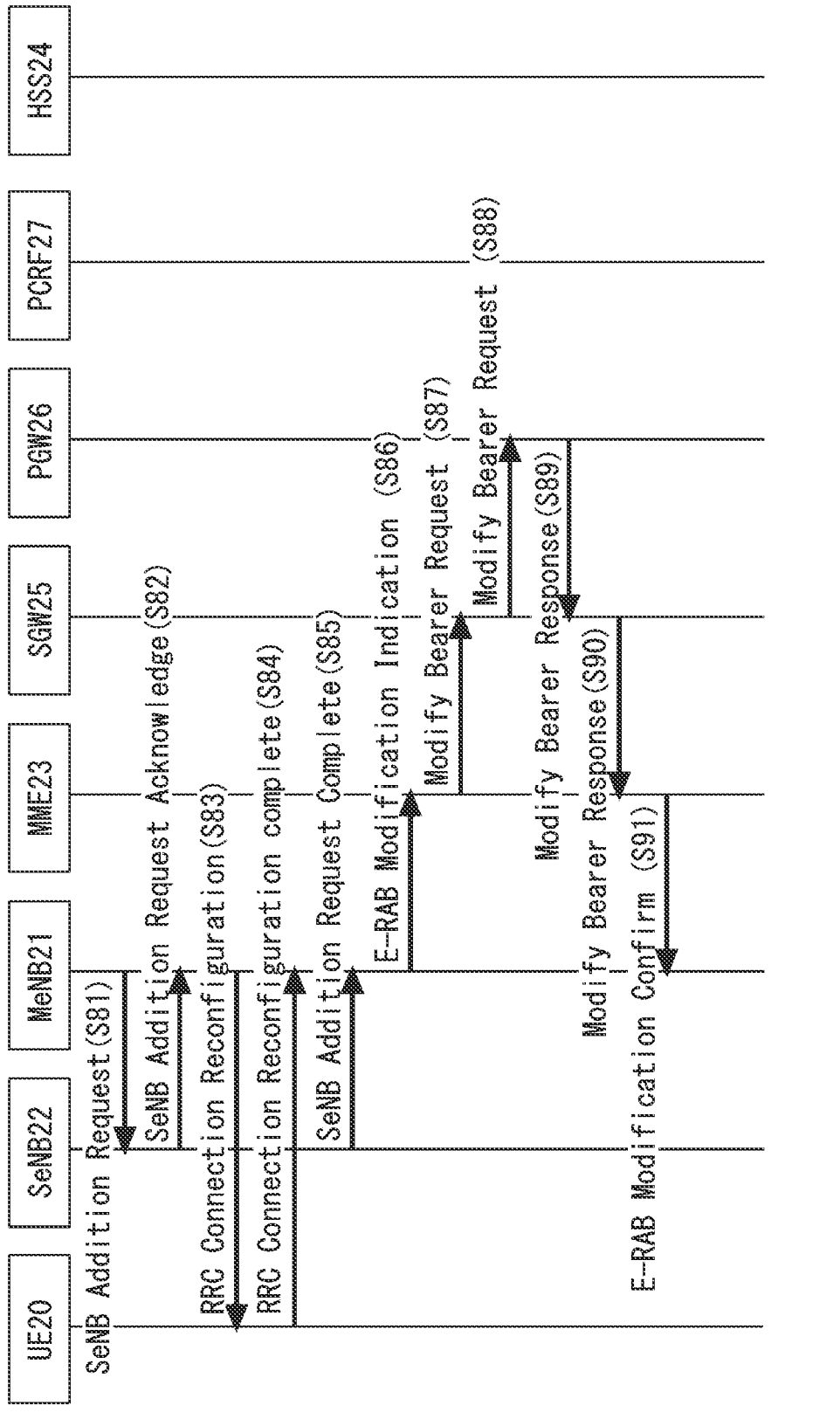
FIG. 15 is a view showing an E-UTRAN initiated E-RAB modification procedure according to a fourth embodiment.

An E-UTRAN initiated E-RAB modification procedure is described with reference to FIG. 15. FIG. 15 refers to the E-UTRAN initiated E-RAB modification procedure described in 3GPP TS 23.401 V13.6.1 (2016 March), Section 5.4.7. FIG. 15 shows the flow of a process of adding the SeNB 22 when the MeNB 21 executes dual connectivity.

First, the MeNB 21 transmits an SeNB Addition Request message to the SeNB 22 (S81). The SeNB Addition Request message contains Count Rule as a parameter.

Next, the SeNB 22 transmits an SeNB Addition Request Acknowledge message to the MeNB 21 (S82). The MeNB 21 then transmits an RRC Connection Reconfiguration message to the UE 20 (S83). The UE 20 then transmits an RRC Connection Reconfiguration Complete message to the MeNB 21 (S84). Then, the SeNB 22 transmits an SeNB Addition Request Complete message to the MeNB 21 (S85). As a result that the processing in Steps S81 to S85 is performed, the SeNB 22 is added as an eNB that forms dual connectivity.

After that, the MeNB 21 transmits an E-RAB Modification Indication message to the MME 23 (S86). The E-RAB Modification Indication message contains DC Charging Activated as a parameter. Steps S87 to S90 are the same as Steps S46 to S49 in FIG. 10 and the detailed description thereof is omitted.

Then, the MME 23 transmits an E-RAB Modification Confirm message to the MeNB 21 (S91).

As described above, as a result of performing the E-UTRAN initiated E-RAB modification procedure in FIG. 15, the MeNB 21 can transmit DC Charging Activated to the MME 23 when the SeNB 22 is added as an eNB that forms dual connectivity.

On the other hand, in FIG. 10, the MeNB 21 transmits DC Charging Activated to the MME 23 in the Attach process of the UE 20. Thus, FIG. 15 shows that the MeNB 21 counts the amount of packets for each radio bearer after dual connectivity is actually configured in a radio network. Therefore, by performing the E-UTRAN initiated E-RAB modification procedure in FIG. 15, the PGW counts the amount of packets and can thereby carry out charging until dual connectivity is configured.

Note that, when performing the E-UTRAN initiated E-RAB modification procedure in FIG. 15, the MeNB 21 does not contain DC Charging Activated in a message to be transmitted in Step S45 in FIG. 10 and Step S73 in FIG. 14.

Fifth Embodiment

Figure 16:
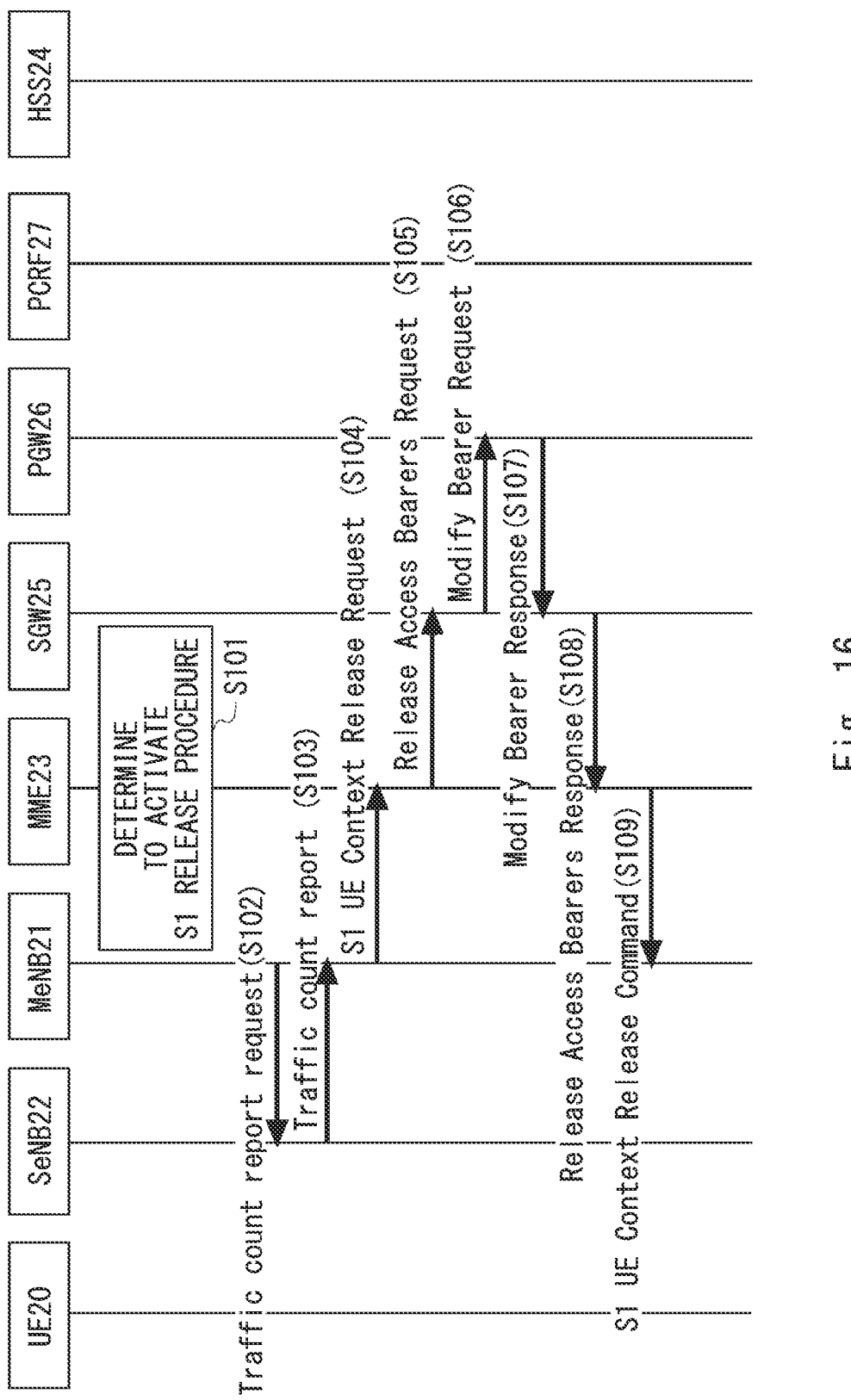
FIG. 16 is a view showing an S1 release procedure according to a fifth embodiment.

An S1 release procedure according to a fifth embodiment is described with reference to FIG. 16. FIG. 16 shows a process to be performed when the UE 20 transitions to the Idle state. To be specific, FIG. 16 shows the process of releasing a communication bearer related to the UE 20 between the MeNB 21 and the core network.

First, the MeNB 21 determines to activate an S1 release procedure upon transition of the UE 20 to the Idle state (S101). Next, the MeNB 21 transmits a Traffic Count Report Request message to the SeNB 22 (S102). The MeNB 21 transmits the Traffic Count Report Request message to the SeNB 22 in order to cause the SeNB 22 to transmit data about the amount of packets for each radio bearer counted in the SeNB 22.

Then, the SeNB 22 transmits a Traffic Count Report message to the MeNB 21 (S103). The Traffic Count Report message contains Traffic Data indicating data about the amount of packets for each radio bearer counted in the SeNB 22.

Then, the MeNB 21 transmits an S1 UE Context Release Request message to the MME 23 (S104). The S1 UE Context Release Request message contains Traffic Data acquired by the MeNB 21 from the SeNB 22 and Traffic Data which is information about the amount of packets counted in the MeNB 21.

Then, the MME 23 transmits a Release Access Bearers Request message to the SGW 25 (S105). The Release Access Bearers Request message contains the same Traffic Data as the Traffic Data contained in the S1 UE Context Release Request message. The SGW 25 then transmits a Modify Bearer Request message to the PGW 26 (S106). The Traffic Data contained in the Modify Bearer Request message in Step S106 is the same as the Traffic Data contained in the Modify Bearer Request message in Step S105.

Then, the PGW 26 transmits a Modify Bearer Response message to the SGW 25 (S107). The SGW 25 then transmits a Release Access Bearers Response message to the MME 23 (S108). The MME 23 then transmits an S1 UE Context Release Command message to the MeNB 21 (S109).

Further, a message used for transmitting Traffic Data is not limited to the message shown in FIG. 16. The messages after Step S104 shown in FIG. 16 are the messages defined in 3GPP. For example, a new message that is not currently defined in 3GPP may be used as a message after Step S104. For example, a new message of a Traffic Report Request message may be used instead of the Modify Bearer Request message. Further, a new message of a Traffic Report Response message may be used instead of the Modify Bearer Response message.

Figure 17:
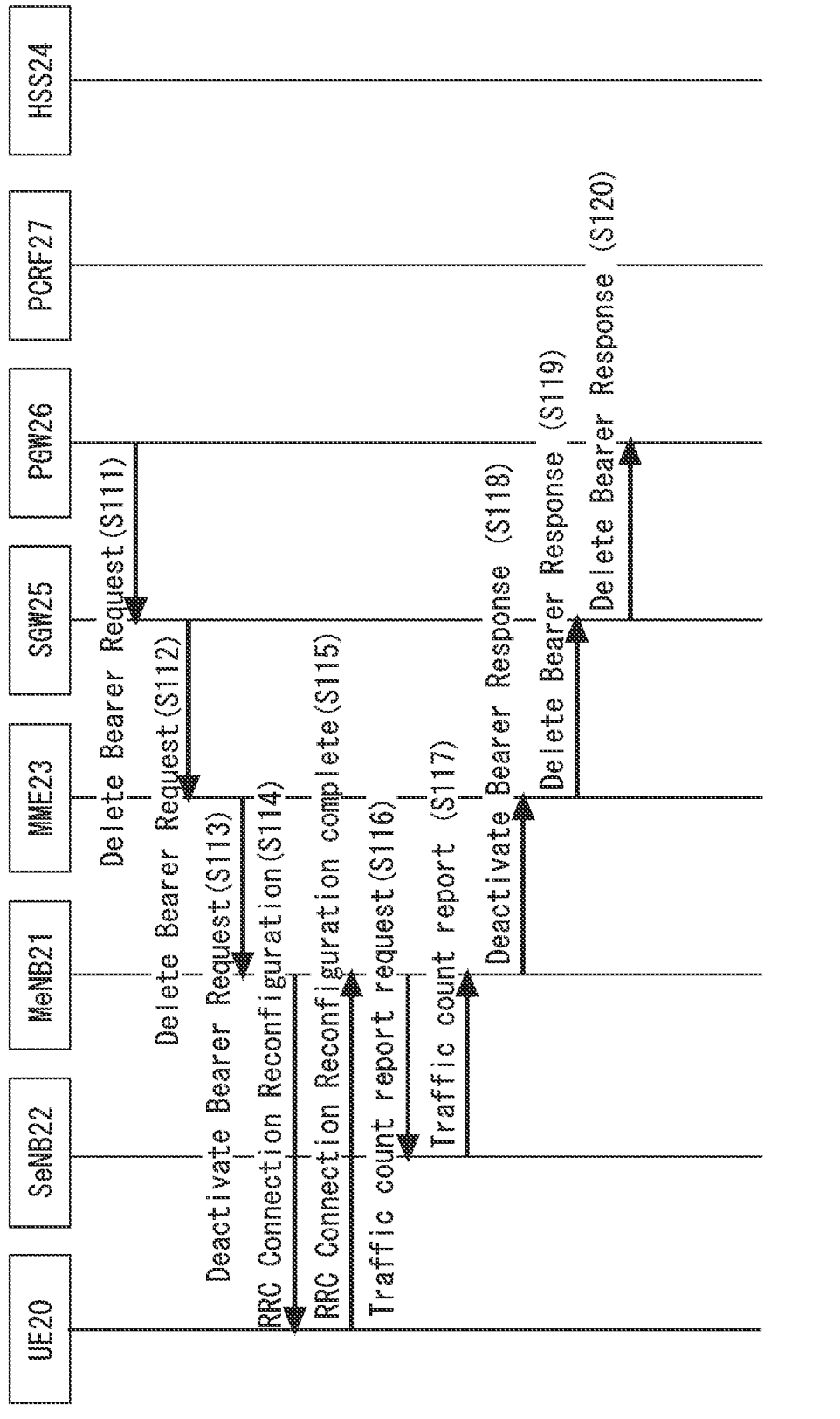
FIG. 17 is a view showing a PDN GW initiated bearer deactivation procedure according to the fifth embodiment.

A PDN GW initiated bearer deactivation procedure according to the fifth embodiment is described hereinafter with reference to FIG. 17. FIG. 17 shows a process to be performed when the PGW 26 determines to delete the communication bearer related to the UE 20. This process may be performed with the UE 20 being in the active state.

First, the PGW 26 transmits a Delete Bearer Request message to the SGW 25 (S111). The Delete Bearer Request message contains identification information of the UE 20. Next, the SGW 25 transmits the Delete Bearer Request message transmitted from the PGW 26 to the MME 23 (S112). The MME 23 then transmits the Delete Bearer Request message transmitted from the SGW 25 to the MeNB 21 (S113). The MeNB 21 then transmits an RRC Connection Reconfiguration message to the UE 20 (S114). The UE 20 then transmits an RRC Connection Reconfiguration Complete message to the MeNB 21 (S115).

Then, the MeNB 21 transmits a Traffic Count Report Request message to the SeNB 22 (S116). The MeNB 21 transmits the Traffic Count Report Request message to the SeNB 22 in order to cause the SeNB 22 to transmit data about the amount of packets for each radio bearer counted in the SeNB 22.

Then, the SeNB 22 transmits a Traffic Count Report message to the MeNB 21 (S117. The Traffic Count Report message contains Traffic Data indicating data about the amount of packets for each radio bearer counted in the SeNB 22.

Then, the MeNB 21 transmits a Deactive Bearer Response message to the MME 23 (S118). The Deactive Bearer Response message contains Traffic Data acquired by the MeNB 21 from the SeNB 22 and Traffic Data which is information about the amount of packets counted in the MeNB 21.

The MME 23 then transmits the Deactive Bearer Response message transmitted from the MeNB 21 to the SGW 25 (S119). Further, the SGW 25 transmits the Deactive Bearer Response message transmitted from the MME 23 to the PGW 26 (S120).

Figure 18:
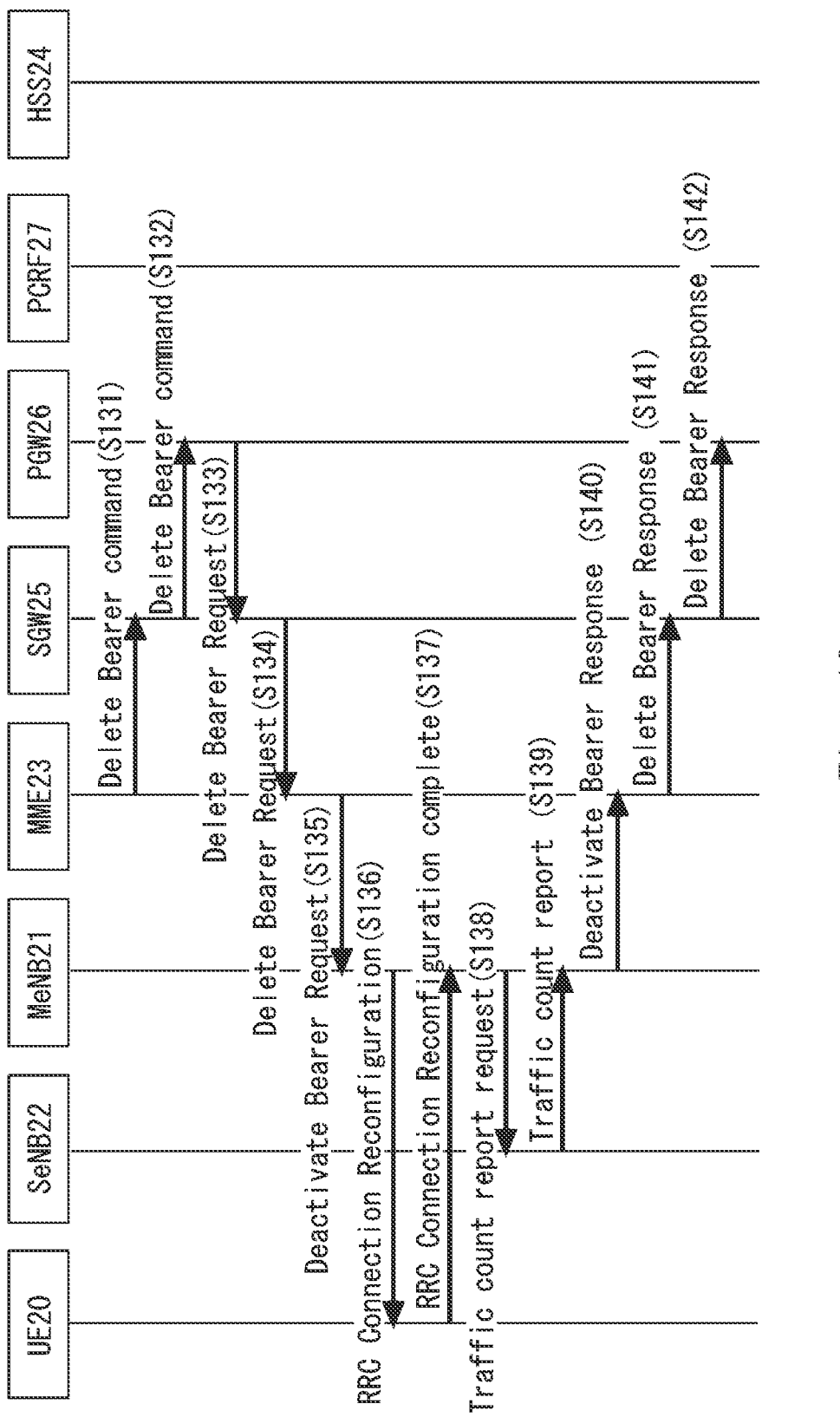
FIG. 18 is a view showing an MME initiated bearer deactivation procedure according to the fifth embodiment.

An MME initiated bearer deactivation procedure according to the fifth embodiment is described hereinafter with reference to FIG. 18. FIG. 18 shows a process to be performed when the MME 23 determines to delete the communication bearer related to the UE 20. This process may be performed with the UE 20 being in the active state.

First, the MME 23 transmits a Delete Bearer Command message to the SGW 25 (S131). The Delete Bearer Command message contains identification information of the UE 20. Next, the SGW 25 transmits the Delete Bearer Command message transmitted from the MME 23 to the PGW 26 (S132).

Steps S133 to S142 are the same as Steps S111 to S120 in FIG. 17 and the detailed description thereof is omitted.

As described above, by performing the processing in Steps S16 and S18, the MeNB 21 can acquire data about the amount of packets for each radio bearer counted in the SeNB 22 when releasing the communication bearer related to the UE 20.

Sixth Embodiment

Figure 19:
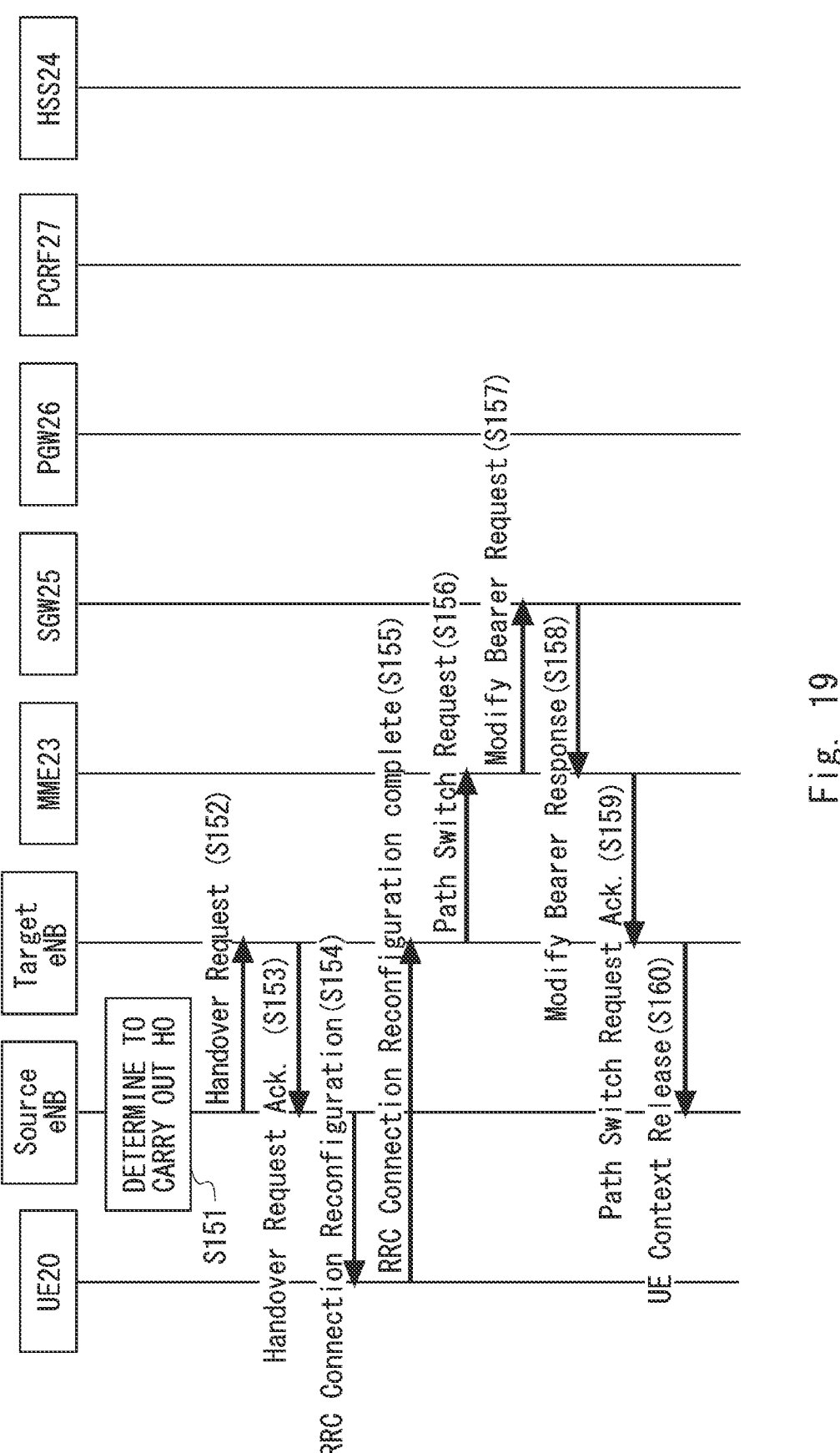
FIG. 19 is a view showing an X2 HO procedure according to a sixth embodiment.

An X2 HO (Hand Over) procedure is described hereinafter with reference to FIG. 19. FIG. 19 shows the flow of a handover process without a change in the MME 23. Further, FIG. 19 shows the flow of a handover process when an eNB, to which handover is made, can count the amount of packets for each radio bearer.

A source eNB, from which handover is made, determines to carry out handover of the UE 20 (S151). For example, the MeNB 21 may be the source eNB. In this case, the MeNB 21 first performs the procedure shown in Step S51 and Step S52 in FIG. 12 with the SeNB 22 and thereby acquires Traffic Data measured in the SeNB 22. Next, the source eNB transmits a Handover Request message to a target eNB (S152). The target eNB is an eNB that forms the communication area to which the UE 20 moves. The Handover Request message contains Count Rule, Traffic Data, and DC Not Allowed. The Count Rule is the Count Rule that is applied when the source eNB counts the amount of packets for each radio bearer. The Traffic Data is information about the amount of packets counted for each radio bearer in the source eNB. The DC Not Allowed is information indicating whether or not the UE 20 is allowed to configure dual connectivity.

Then, the target eNB transmits a Handover Request Ack message to the source eNB (S153). The Handover Request Ack message contains DC Traffic Count Support Indication as a parameter. The DC Traffic Count Support Indication is information indicating that the target eNB can count the amount of packets for each radio bearer.

Next, the source eNB transmits an RRC Connection Reconfiguration message to the UE 20 (S154). The UE 20 transmits an RRC Connection Reconfiguration Complete message to the target eNB (S155).

Then, the target eNB transmits a Path Switch Request message to the MME 23 in order to switch an eNB which the UE 20 connects to (S156). The MME 23 then transmits a Modify Bearer Request message to the SGW 25 (S157). The SGW 25 then transmits a Modify Bearer Response message to the MME 23 (S158). Then, the MME 23 transmits a Path Switch Request Ack message to the target eNB (S159). The target eNB then transmits a UE Context Release message to the source eNB (S160).

Figure 20:
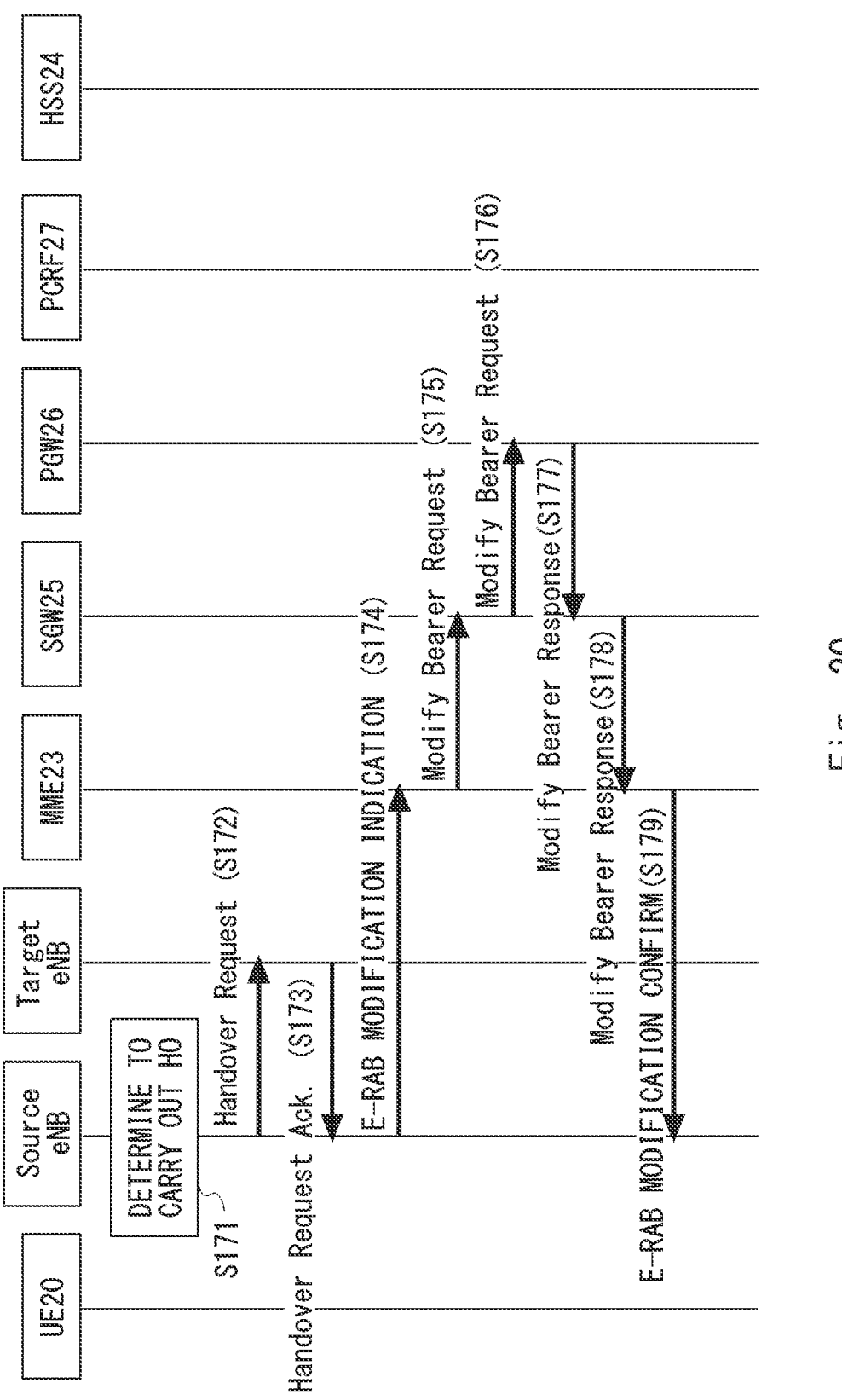
FIG. 20 is a view showing the X2 HO procedure according to the sixth embodiment.
Figure 21:
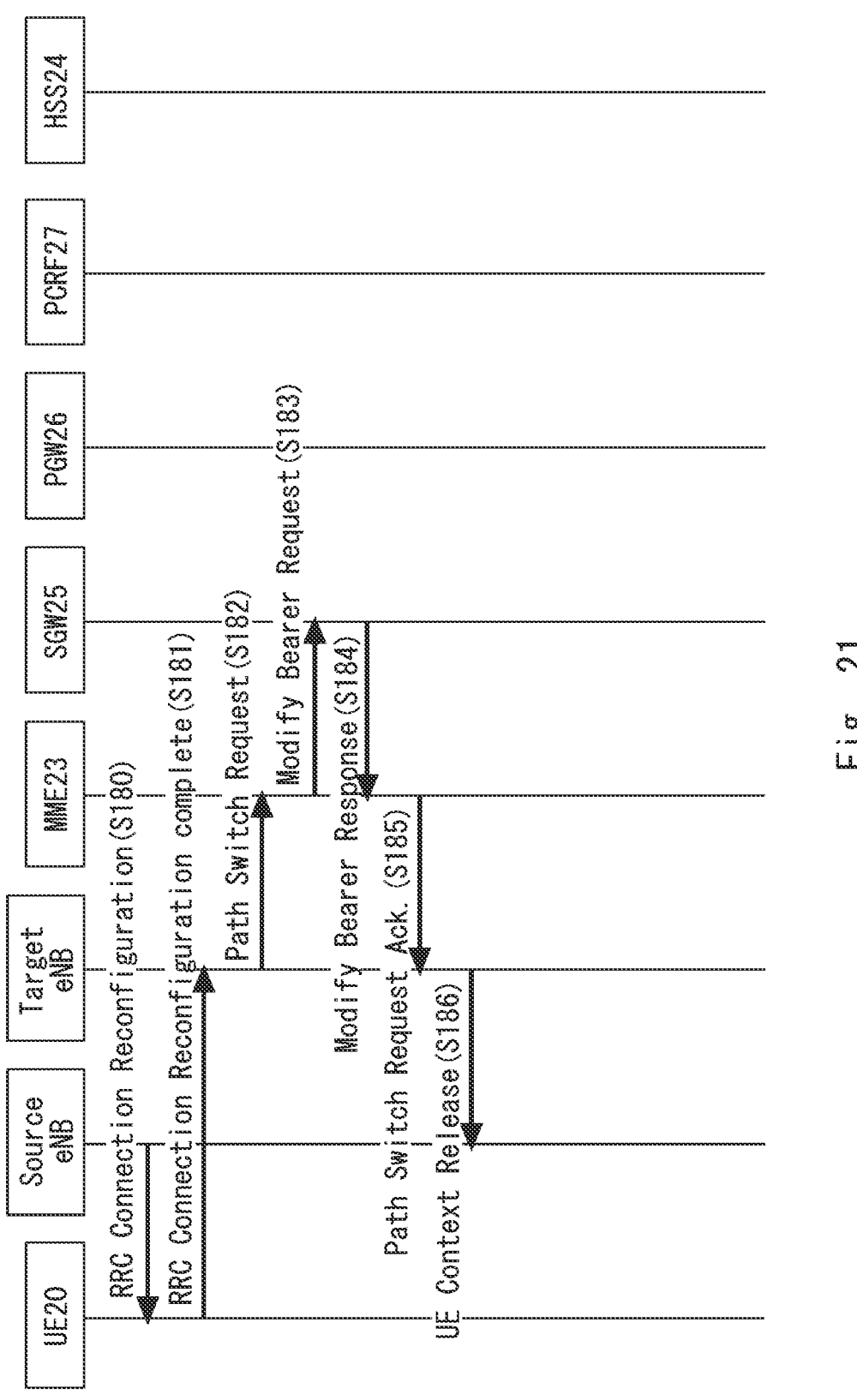
FIG. 21 is a view showing the X2 HO procedure according to the sixth embodiment.

By performing the process in FIG. 19, a handover process ends between the source eNB and the target eNB. Further, by performing the process in FIG. 19, processing of counting the amount of packets for each radio bearer is handed over from the source eNB to the target eNB An X2 HO (Hand Over) procedure is described hereinafter with reference to FIGS. 20 and 21. FIGS. 20 and 21 show the flow of a handover process without a change in the MME 23. Further, FIGS. 20 and 21 show the flow of a handover process when an eNB, to which handover is made, cannot count the amount of packets for each radio bearer.

Steps S171 and S172 are the same as Steps S151 and S152 in FIG. 19 and the detailed description thereof is omitted. Next, the target eNB transmits a Handover Request Ack message to the source eNB (S173). The Handover Request Ack message does not contain DC Traffic Count Support Indication, or contains DC Traffic Count Not Support Indication. With the Handover Request Ack message not containing DC Traffic Count Support Indication or containing DC Traffic Count Not Support Indication, the target eNB notifies the source eNB that it is not possible to count the amount of packets for each radio bearer.

Then, the source eNB transmits an E-RAB Modification Indication message to the MME 23 (S174). The E-RAB Modification Indication message contains Traffic Data and DC Traffic Count Stop. The DC Traffic Count Stop is information indicating that counting of the amount of packets for each radio bearer in the source eNB is to stop. Alternatively, the DC Traffic Count Stop may be information indicating that counting of the amount of packets for each radio bearer in the source eNB has stopped.

The MME 23 transmits a Modify Bearer Request message to the SGW 25 (S175). The Modify Bearer Request message contains the Traffic Data and the DC Traffic Count Stop contained in the E-RAB Modification Indication message received in Step S174. The SGW 25 then transmits the Modify Bearer Request message received from MME 23 to the PGW 26 (S176).

Then, the PGW 26 transmits a Modify Bearer Response message to the SGW 25 (S177). The SGW 25 then transmits the Modify Bearer Response message received from the PGW 26 to the MME 23 (S178). The MME 23 then transmits an E-RAB Modification Confirm message to the source eNB (S179).

Steps S180 to S186 in FIG. 21 are the same as Steps S154 to S160 in FIG. 19 and the detailed description thereof is omitted.

By performing the process in FIGS. 20 and 21, when the target eNB cannot count the amount of packets for each radio bearer, the source eNB can notify the PGW 26, through the MME 23 and the SGW 25, that counting of the amount of packets for each radio bearer is to stop. The PGW 26 can thereby start processing of counting the amount of packets related to the UE 20. In other words, the PGW 26 can hand over processing of counting the amount of packets related to the UE 20 from the source eNB.

Figure 22:
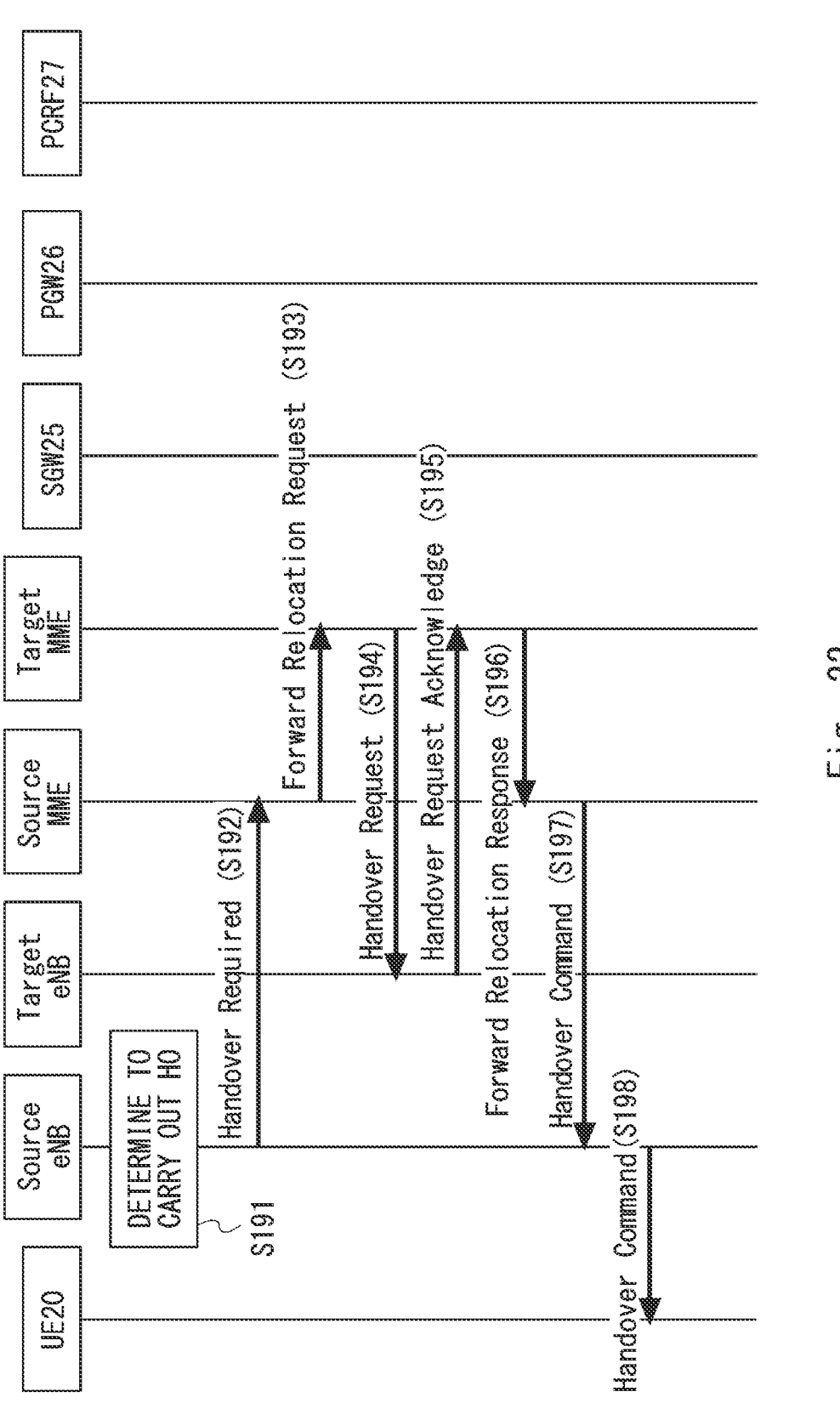
FIG. 22 is a view showing the S1 HO procedure according to the sixth embodiment.
Figure 23:
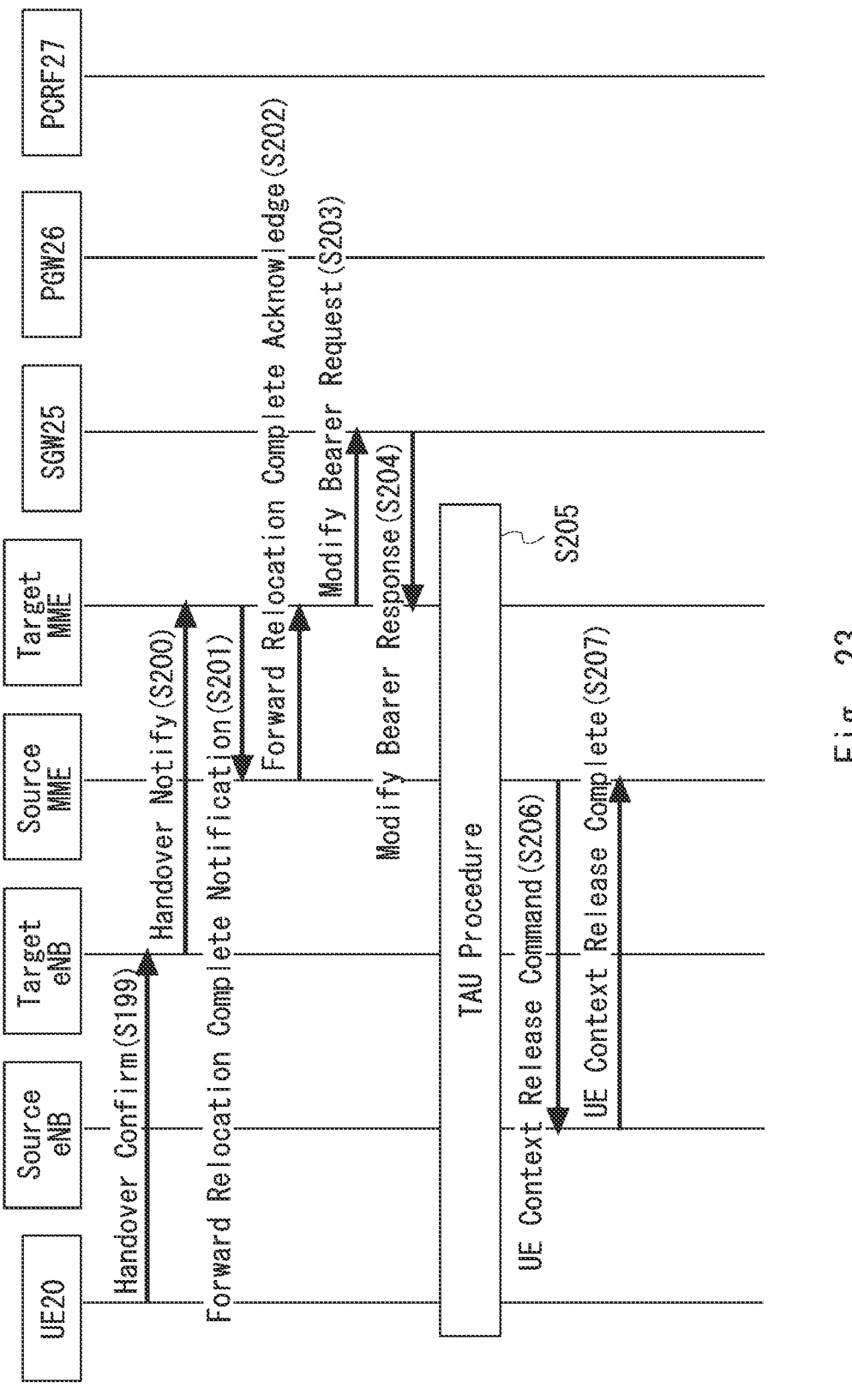
FIG. 23 is a view showing the S1 HO procedure according to the sixth embodiment.

An S1 HO procedure is described hereinafter with reference to FIGS. 22 and 23. FIGS. 22 and 23 show the flow of a handover process with a change in the MME 23. Further, FIGS. 22 and 23 show the flow of a handover process when an eNB, to which handover is made, can count the amount of packets for each radio bearer.

First, a source eNB, from which handover is made, determines to carry out handover of the UE 20 (S191). For example, the MeNB 21 may be the source eNB. In this case, the MeNB 21 first performs the procedure shown in Step S51 and Step S52 in FIG. 12 with the SeNB 22 and thereby acquires Traffic Data measured in the SeNB 22. Next, the source eNB transmits a Handover Required message to a source MME (S192). The source MME may be the MME 23. The Handover Required message contains Source to Target Transparent Container. The Source to Target Transparent Container is information containing Count Rule and Traffic Data.

Then, the source MME transmits a Forward Relocation Request message to a target MME (S193). The Forward Relocation Request message contains Source to Target Transparent Container. The source MME adds DC Not Allowed to the Source to Target Transparent Container transmitted from the source eNB. The source MME transmits a Forward Relocation Request message that contains the Source to Target Transparent Container to which the DC Not Allowed is added. The DC Not Allowed added by the source MME is information indicating whether or not the UE 20 is able to configure dual connectivity. The DC Not Allowed added by the source MME is subscriber information acquired by the source MME from the HSS 24.

Then, the target MME transmits a Handover Request message to a target eNB (S194). The Handover Request message contains the Source to Target Transparent Container transmitted from the source MME. The target eNB then transmits a Handover Request Acknowledge message to the target MME (S195). The Handover Request Acknowledge contains Target to Source Transparent Container. The Target to Source Transparent Container contains DC Traffic Count Support Indication. The DC Traffic Count Support Indication is information indicating that the target eNB can count the amount of packets for each radio bearer.

Then, the target MME transmits a Forward Relocation Response message to the source MME (S196). The Forward Relocation Response message contains DC Traffic Count Support Indication and Target to Source Transparent Container. The DC Traffic Count Support Indication is information indicating whether or not the target MME can deal with counting the amount of packets for each radio bearer in the target eNB. The Target to Source Transparent Container is the same as the Target to Source Transparent Container transmitted from the target eNB.

Then, the source MME transmits a Handover Command message to the source eNB (S197). The Handover Command message contains DC Traffic Count Support Indication and Target to Source Transparent Container. The Target to Source Transparent Container is the same as the Target to Source Transparent Container transmitted from the target MME. Then, the source eNB transmits a Handover Command message to the UE 20 (S198).

Referring to FIG. 23, the UE 20 then transmits a Handover Confirm message to the target eNB (S199). The target eNB then transmits a Handover Notify message to the target MME (S200). The target MME then transmits a Forward Relocation Complete Notification message to the source MME (S201). The source MME then transmits a Forward Relocation Complete Acknowledge message to the target MME (S202).

Then, the target MME transmits a Modify Bearer Request message to the SGW 25 (S203). The SGW 25 then transmits a Modify Bearer Response message to the target MME (S204). After that, a TAU (Tracking Area Update) Procedure is performed in the UE 20, the target eNB and the target MME (S205).

The source MME then transmits a UE Context Release Command message to the source eNB (S206). The source eNB then transmits a UE Context Release Complete message to the source MME (S207).

Figure 24:
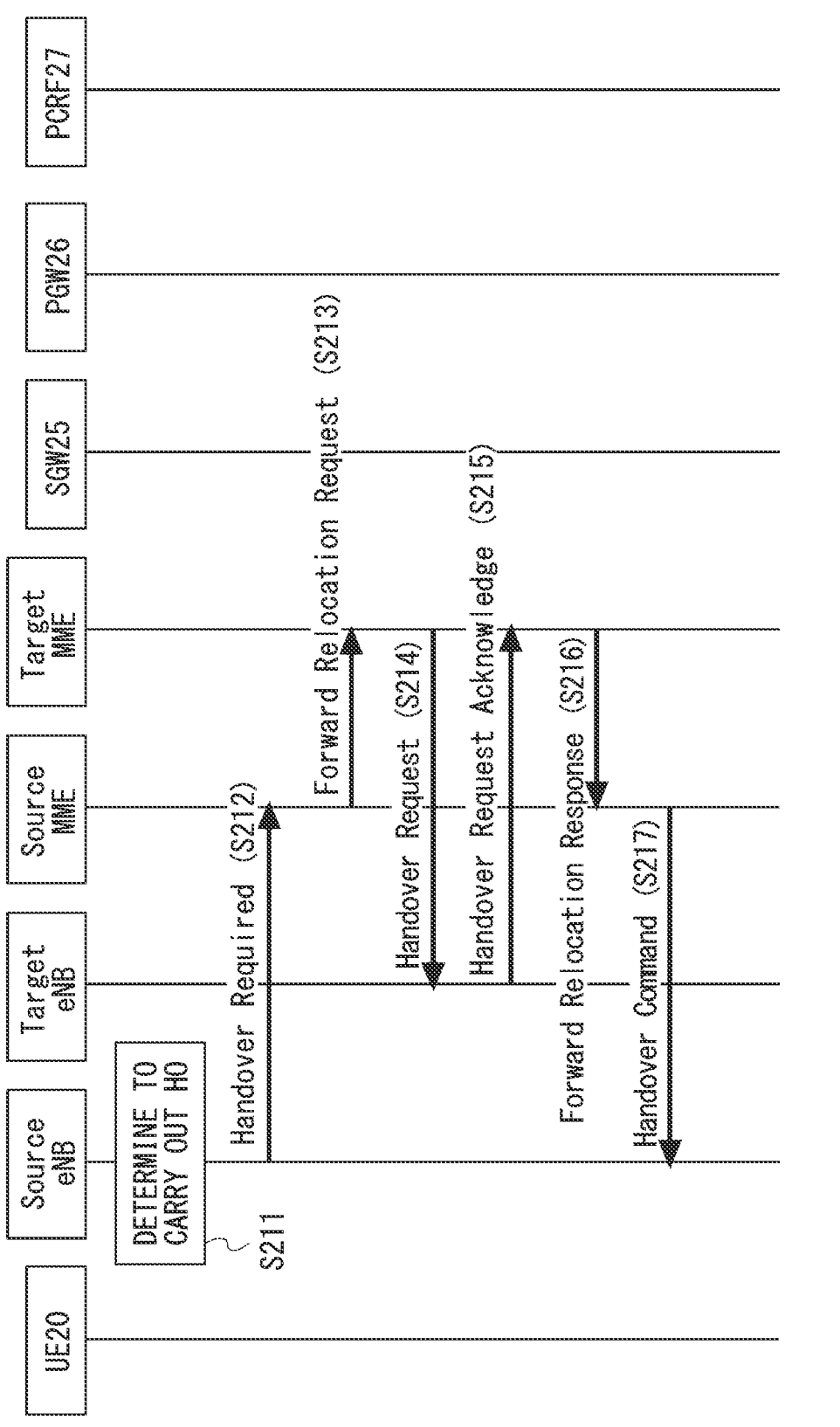
FIG. 24 is a view showing the S1 HO procedure according to the sixth embodiment.
Figure 26:
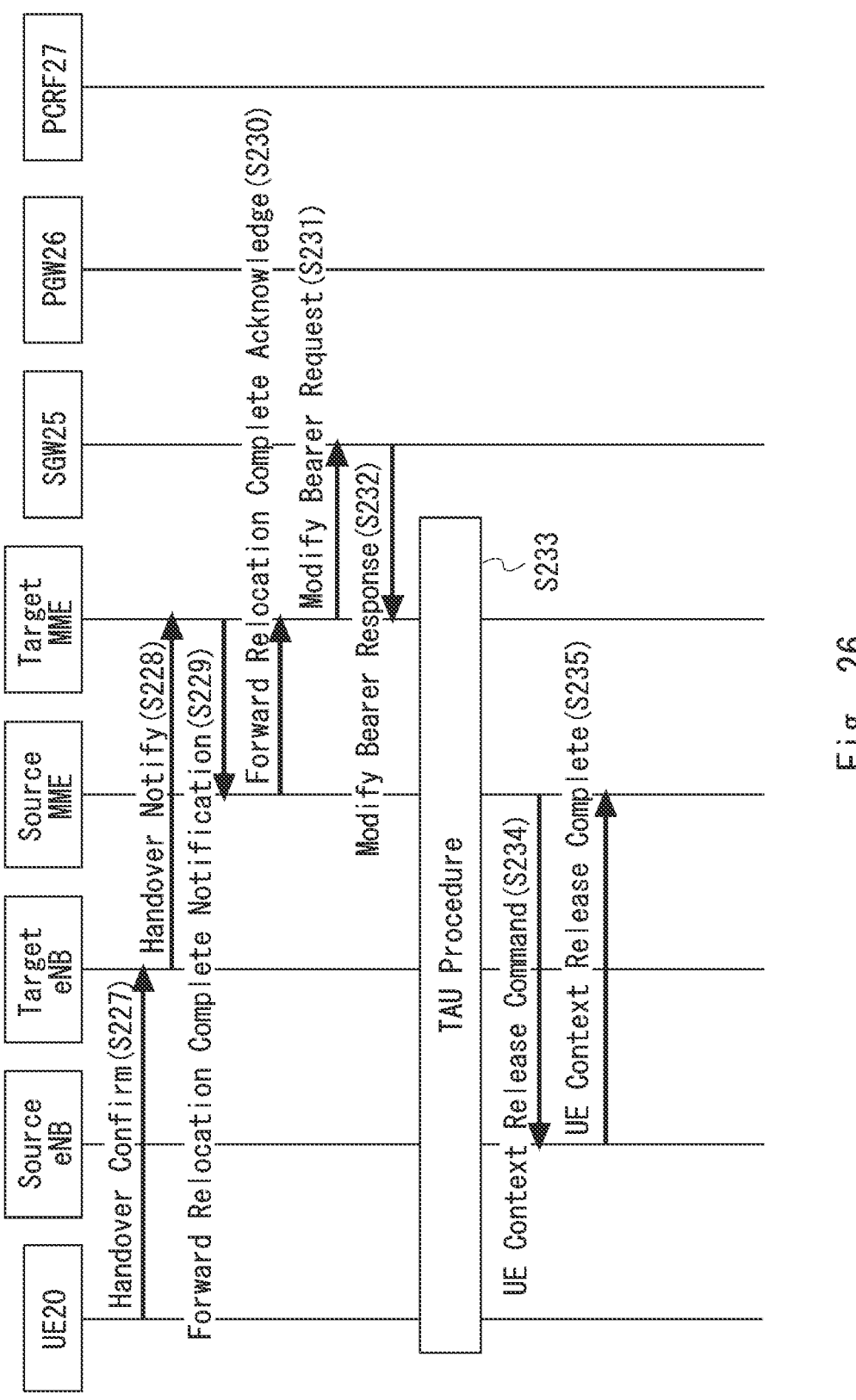
FIG. 26 is a view showing the S1 HO procedure according to the sixth embodiment.

An S1 HO procedure is described hereinafter with reference to FIGS. 24 and 26. FIGS. 24 and 26 show the flow of a handover process with a change in the MME 23. Further, FIGS. 24 and 26 show the flow of a handover process when an eNB, to which handover is made, cannot count the amount of packets for each radio bearer.

Steps S211 and S214 are the same as Steps S191 and S194 in FIG. 22 and the detailed description thereof is omitted. Next, the target eNB transmits a Handover Request Acknowledge message to the target MME (S215). The Handover Request Acknowledge contains Target to Source Transparent Container. Further, the Target to Source Transparent Container does not contain DC Traffic Count Support Indication, or contains DC Traffic Count Not Support Indication. Thus, the target eNB notifies the target MME that it is not possible to count the amount of packets for each radio bearer.

Then, the target MME transmits a Forward Relocation Response message to the source MME (S216). The Forward Relocation Response message does not contain DC Traffic Count Support Indication, or contains DC Traffic Count Not Support Indication. Further, the Forward Relocation Response message contains Target to Source Transparent Container. Not containing DC Traffic Count Support Indication or containing DC Traffic Count Not Support Indication is information indicating that the target MME cannot deal with counting the amount of packets for each radio bearer in the target eNB. The Target to Source Transparent Container is the same as the Target to Source Transparent Container transmitted from the target eNB.

Then, the source MME transmits a Handover Command message to the source eNB (S217). The Handover Command message does not contain DC Traffic Count Support Indication, or contains DC Traffic Count Not Support Indication. Further, the Handover Command message contains Target to Source Transparent Container. The information contained in the Handover Command message is the same as the information contained in the Forward Relocation Response message received in Step S216.

Figure 25:
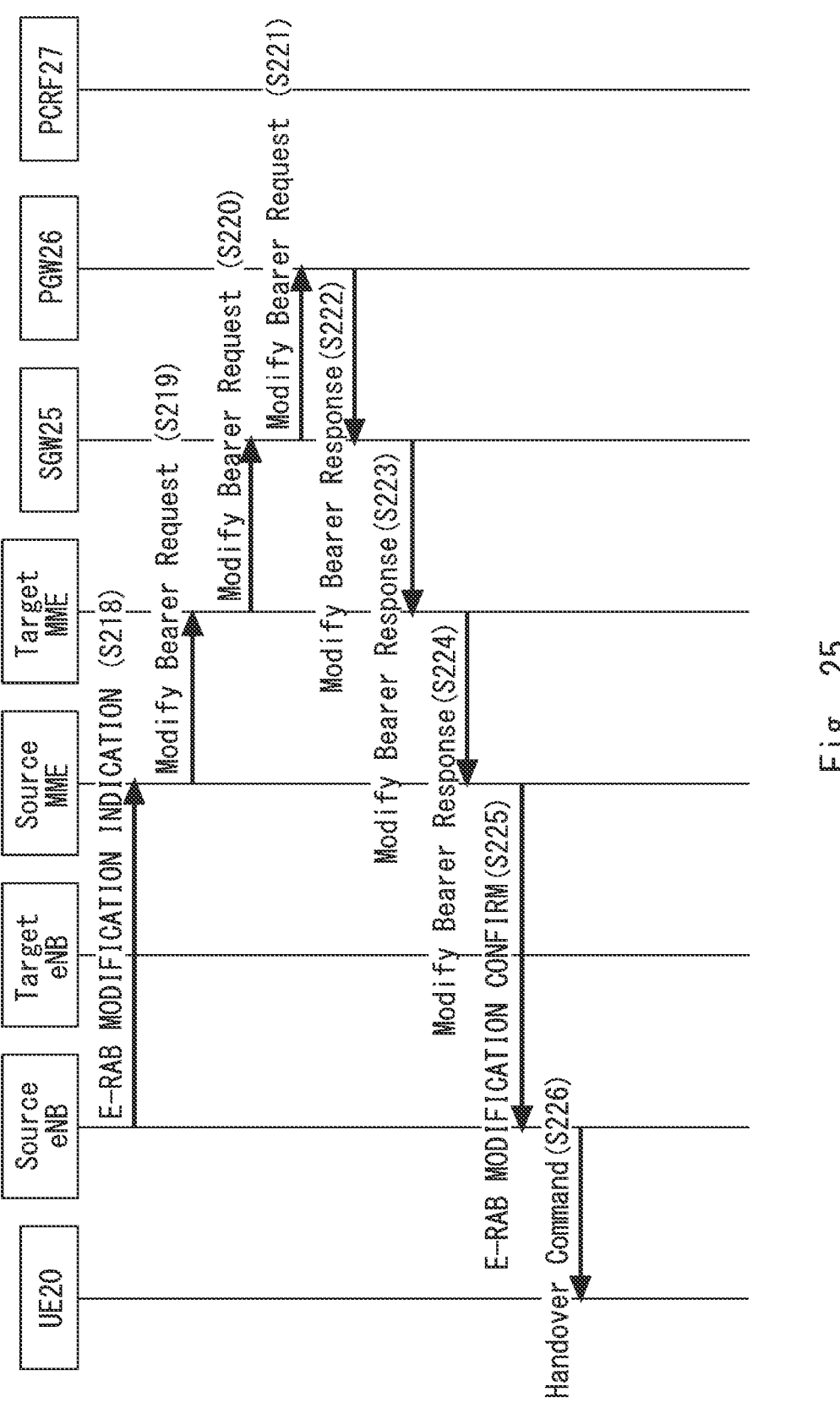
FIG. 25 is a view showing the S1 HO procedure according to the sixth embodiment.

Steps S218 to S225 are substantially the same as Steps S174 and S179 in FIG. 20. Note that, however, FIG. 25 shows the flow of a handover process with a change in the MME. Thus, FIG. 25 shows that a Modify Bearer Request message and a Modify Bearer Response message are transmitted and received between the source MME and the target MME.

Step S226 in FIG. 25 and Steps S227 to S235 in FIG. 26 are the same as Step S198 in FIG. 22 and Steps S199 to S207 in FIG. 23, and the detailed description thereof is omitted.

As described above, by performing the process according to the sixth embodiment, it is possible to hand over the amount of packets for each radio bearer counted in the source eNB to the target eNB when handover related to the UE 20 is carried out. Further, when the target eNB cannot count the amount of packets for each radio bearer, the PGW 26 can hand over the counting of the amount of packets related to the UE 20.

Figure 27:
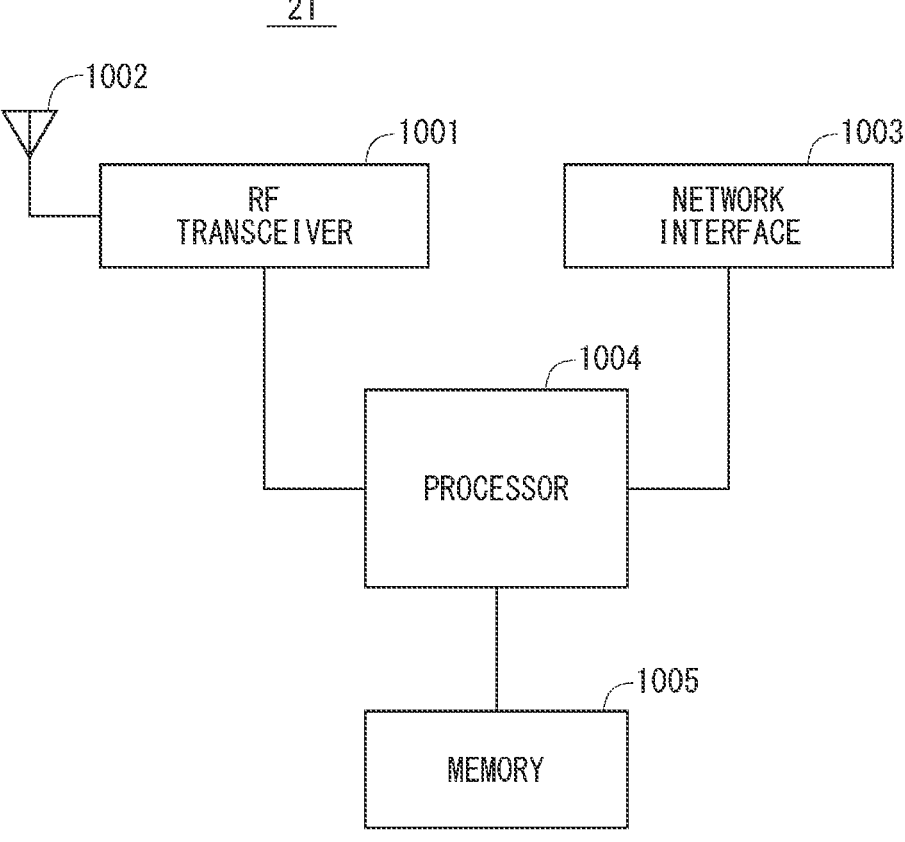
FIG. 27 is a schematic diagram of an MeNB according to each embodiment.

Configuration examples of the UE 20, and the MeNB 21 and the MME 23 described in the plurality of embodiments above are described hereinafter. FIG. 27 is a block diagram showing a configuration example of the eNB 60. Referring to FIG. 27, the MeNB 21 includes an RF transceiver 1001, a network interface 1003, a processor 1004, and a memory 1005. The RF transceiver 1001 performs analog RF signal processing for communication with the UEs. The RF transceiver 1001 may include a plurality of transceivers. The RF transceiver 1001 is connected to an antenna 1002 and a processor 1004. The RF transceiver 1001 receives modulated symbol data (or OFDM symbol data) from the processor 1004, generates a transmission RF signal and supplies the transmission RF signal to the antenna 1002. Further, the RF transceiver 1001 generates a baseband received signal based on a received RF signal received by the antenna 1002 and supplies it to the processor 1004.

The network interface 1003 is used for communications with a network node (e.g., other eNBs, Mobility Management Entity (MME), Serving Gateway (S-GW), and TSS or ITS server). The network interface 1003 may include a network interface card (NIC) compliant to IEEE 802.3 series, for example.

The processor 1004 performs data plane processing including digital baseband signal processing and control plane processing for radio communications. For example, in the case of LTE and LTE-Advanced, the digital baseband signal processing by the processor 1004 may include signal processing of PDCP layer, RLC layer, MAC layer and PHY layer. Further, the signal processing by the processor 1004 may include signal processing of GTP-U-UDP/IP layer in the X2-U interface and the S1-U interface. Furthermore, the control plane processing by the processor 1004 may include processing of X2AP protocol, S1-MME protocol and RRC protocol.

The processor 1004 may include a plurality of processors. For example, the processor 1004 may include a modem processor (e.g., DSP) that performs digital baseband signal processing, a processor (e.g., DSP) that performs signal processing of GTP-U-UDP/IP layer in the X2-U interface and the S1-U interface, and a protocol stack processor (e.g., CPU or MPU) that performs control plane processing.

The memory 1005 is a combination of a volatile memory and a nonvolatile memory. The memory 1005 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. The memory 1005 may include a storage that is placed apart from the processor 1004. In this case, the processor 1004 may access the memory 1005 through the network interface 1003 or an I/O interface, which is not shown.

The memory 1005 may store a software module (computer program) containing a group of instructions and data for performing the processing by the MeNB 21 described in the above plurality of embodiments. In several implementations, the processor 1004 may be configured to perform the processing of the eNB 60 described in the above embodiments by reading the software module from the memory 1005 and executing it.

Figure 28:
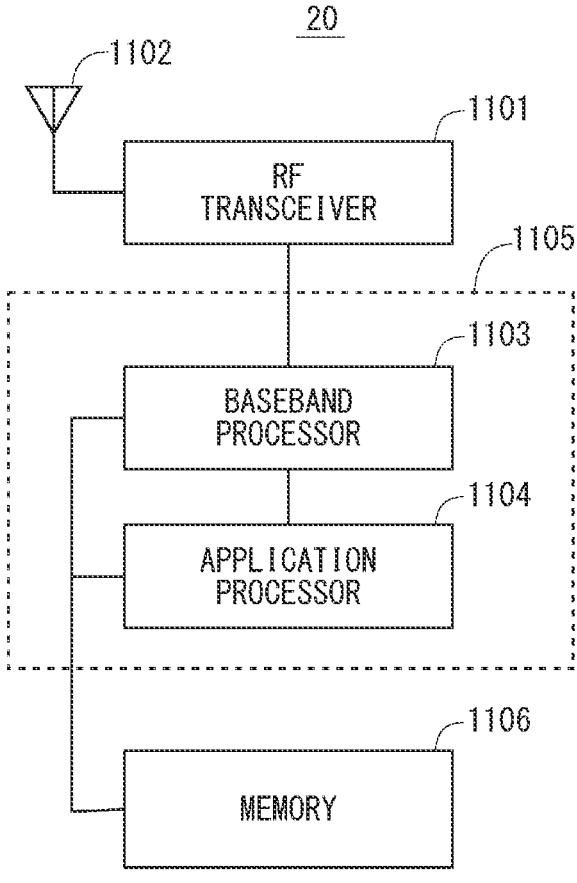
FIG. 28 is a schematic diagram of a UE according to each embodiment.

FIG. 28 is a block diagram showing a configuration example of the UE 20. A Radio Frequency (RF) transceiver 1101 performs analog RF signal processing for communication with the MeNB 21 and the SeNB 22. The analog RF signal processing performed by the RF transceiver 1101 includes frequency up-conversion, frequency down-conversion, and amplification. The RF transceiver 1101 is connected to an antenna 1102 and a baseband processor 1103. Specifically, the RF transceiver 1101 receives modulated symbol data (or OFDM symbol data) from the baseband processor 1103, generates a transmission RF signal and supplies the transmission RF signal to the antenna 1102. Further, the RF transceiver 1101 generates a baseband received signal based on a received RF signal received by the antenna 1102 and supplies it to the baseband processor 1103.

The baseband processor 1103 performs digital baseband signal processing (data plane processing) and control plane processing for radio communications. The digital baseband signal processing includes (a) data compression/decompression, (b) data segmentation/concatenation, (c) transmission format (transmission frame) composition/decomposition, (d) transmission path encoding/decoding, (e) modulation (symbol mapping)/demodulation, and (f) OFDM symbol data (baseband OFDM signal) generation by Inverse Fast Fourier Transform (IFFT) and the like. On the other hand, the control plane processing includes communication management of Layer 1 (e.g., transmission power control), Layer 2 (e.g., radio resource management and hybrid automatic repeat request (HARQ) processing), and Layer 3 (e.g., attach, mobility, and signaling related to call management).

For example, in the case of LTE and LTE-Advanced, the digital baseband signal processing by the baseband processor 1103 may include signal processing of Packet Data Convergence Protocol (PDCP) layer, Radio Link Control (RLC) layer, MAC layer, and PHY layer. Further, the control plane processing by the baseband processor 1103 may include processing of Non-Access Stratum (NAS) protocol, RRC protocol, and MAC CE.

The baseband processor 1103 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be made common to an application processor 1104, which is described below.

The application processor 1104 is also called a CPU, an MPU, a microprocessor or a processor core. The application processor 1104 may include a plurality of processors (a plurality of processor cores). The application processor 1104 implements each function of the UE 20 by running a system software program (Operating System (OS)) and various application programs (e.g., call application, web browser, mailer, camera control application, music playback application etc.) read from a memory 1106 or a memory, which is not shown.

Figure 29:
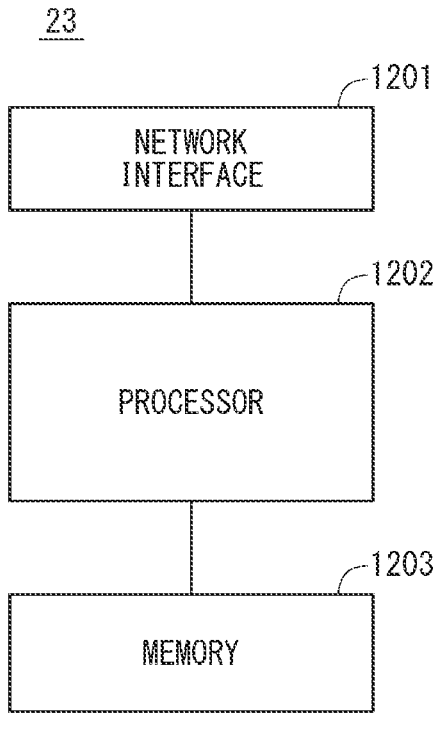
FIG. 29 is a schematic diagram of an MME according to each embodiment.

In several implementations, as shown in the dotted line (1105) in FIG. 29, the baseband processor 1103 and the application processor 1104 may be integrated into one chip. In other words, the baseband processor 1103 and the application processor 1104 may be implemented as one System on Chip (SoC) device 1105. The SoC device is also called a system Large Scale Integration (LSI) or a chip set in some cases.

The memory 1106 is a volatile memory, a nonvolatile memory, or a combination of them. The memory 1106 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. For example, the memory 1106 may include an external memory device that is accessible from the baseband processor 1103, the application processor 1104 and the SoC 1105. The memory 1106 may include an internal memory device that is integrated into the baseband processor 1103, the application processor 1104 or the SoC 1105. Further, the memory 1106 may include a memory in a Universal Integrated Circuit Card (UICC).

The memory 1106 may store a software module (computer program) containing a group of instructions and data for performing the processing by the UE 20 described in the above plurality of embodiments. In several implementations, the baseband processor 1103 or the application processor 1104 may be configured to perform the processing of the UE 20 described in the above embodiments by reading the software module from the memory 1106 and executing it.

FIG. 29 is a block diagram showing a configuration example of the MME 23. Referring to FIG. 29, the MME 23 includes a network interface 1201, a processor 1202, and a memory 1203. The network interface 1201 is used to communicate with network nodes (e.g., the eNodeB 130, MME, P-GW). The network interface 1201 may include a network interface card (NIC) that complies with the IEEE 802.3 series, for example.

The processor 1202 reads and runs software (computer program) from the memory 1203 and thereby executes processing of the MME 23 that is described with reference to the sequence charts and the flowcharts in the embodiments described above. The processor 1202 may be a microprocessor, an MPU or a CPU, for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 29, the memory 1203 is used to store a group of software modules. The processor 1202 reads and runs the group of software modules from the memory 1203 and can thereby perform the processing of the MME 23 described in the above embodiments.

As described with reference to FIGS. 27 and 29, each of processors included in the UE 20, the MeNB 21 and the MME 23 in the above embodiments runs one or a plurality of programs including a group of instructions for causing a computer to perform the algorithms described using the drawings.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described embodiments and may be varied in many ways within the scope of the present invention. Further, in this disclosure, embodiments can be combined as appropriate.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-105254 filed on May 26, 2016, the disclosure of which is incorporated herein in its entirety by reference.

Further, the whole or part of the embodiments disclosed above can be described as, but not limited to, the following supplementary notes.

Supplementary Note 1

A communication system comprising:

a communication terminal configured to communicate with a plurality of communication devices by using a different radio bearer for each of the plurality of communication devices; and a control device configured to determine whether to cause the communication device to measure traffic of each radio bearer.

Supplementary Note 2

The communication system according to Supplementary Note 1, wherein the control device receives, from the communication device, count support information as to whether the communication device is able to measure traffic of each radio bearer.

Supplementary Note 3

The communication system according to Supplementary Note 2, wherein the control device determines whether to cause the communication device to measure traffic of each radio bearer by using the count support information and communication permission information indicating whether the communication terminal is allowed to communicate with a plurality of communication devices by using a plurality of radio bearers.

Supplementary Note 4

The communication system according to Supplementary Note 3, wherein the control device receives the communication permission information from a gateway device connected to a charging system and a subscriber information management device.

Supplementary Note 5

The communication system according to Supplementary Note 4, wherein the control device receives initiation information indicating initiation of processing of measuring traffic of each radio bearer from the communication device, and transmits the initiation information to the gateway device.

Supplementary Note 6

The communication system according to any one of Supplementary Notes 2 to 5, wherein the control device transmits the count support information and count rule information to the communication device.

Supplementary Note 7

The communication system according to any one of Supplementary Notes 1 to 6, wherein the communication device receives instruction information instructing to measure traffic of each radio bearer from the control device, and transmits traffic information containing traffic measured for each radio bearer to the control device.

Supplementary Note 8

The communication system according to Supplementary Note 7, wherein the control device receives the traffic information, and transmits the traffic information to a gateway device connected to a charging system.

Supplementary Note 9

A control device comprising:

a control unit configured to determine, when a communication terminal communicates with a plurality of communication devices by using a different radio bearer for each of the plurality of communication devices, whether to cause at least one communication device of the plurality of communication devices to measure traffic of each radio bearer.

Supplementary Note 10

A communication terminal comprising:

a transmitting unit configured to transmit, to a control device, support information indicating whether to be able to perform a plurality of communications by using a different radio bearer for each of a plurality of communication devices;

a receiving unit configured to receive, from the control device, a determination result of determining whether the communication terminal communicates with a plurality of communication devices by using a plurality of radio bearers based on the support information and communication permission information indicating whether the communication terminal is allowed to communicate with a plurality of communication devices by using a plurality of radio bearers; and a control unit configured to perform processing of setting up a plurality of radio bearers with a plurality of communication devices when the determination result contains information instructing to communicate with a plurality of communication devices by using a plurality of radio bearers.

Supplementary Note 11

A communication method comprising:

determining, when a communication terminal communicates with a plurality of communication devices by using a different radio bearer for each of the plurality of communication devices, whether to cause at least one communication device of the plurality of communication devices to measure traffic of each radio bearer; and transmitting a determination result to the communication device.

Supplementary Note 12

A communication method in a communication system, comprising:

transmitting, from a communication device that wirelessly communicates with a communication terminal to a control device, information regarding a radio bearer to be used for communications of the communication terminal.

Supplementary Note 13

The communication method according to Supplementary Note 12, wherein the information regarding a radio bearer is information indicating whether to support measurement of traffic of each radio bearer.

Supplementary Note 14

The communication method according to Supplementary Note 12 or 13, wherein the control device determines whether to cause the communication device to measure traffic of each radio bearer based on the information regarding a radio bearer.

Supplementary Note 15

The communication method according to any one of Supplementary Notes 12 to 14, wherein the control device transmits the information regarding a radio bearer to a gateway device that transfers communications related to the communication terminal.

Supplementary Note 16

A communication system comprising:

a communication device configured to wirelessly communicate with a communication terminal; and a control device, wherein information regarding a radio bearer to be used for communications of the communication terminal is transmitted from the communication device to the control device.

Supplementary Note 17

The communication system according to Supplementary Note 16, wherein the information regarding a radio bearer is information indicating whether to support measurement of traffic of each radio bearer.

Supplementary Note 18

The communication system according to Supplementary Note 16 or 17, wherein the control device determines whether to cause the communication device to measure traffic of each radio bearer based on the information regarding a radio bearer.

Supplementary Note 19

The communication system according to any one of Supplementary Notes 16 to 18, wherein the control device transmits the information regarding a radio bearer to a gateway device that transfers communications related to the communication terminal.

Supplementary Note 20

A communication device comprising:

a means for wirelessly communicating with a communication terminal; and a means for transmitting information regarding a radio bearer to be used for communications of the communication terminal to a control device.

Supplementary Note 21

The communication device according to Supplementary Note 20, wherein the information regarding a radio bearer is information indicating whether to support measurement of traffic of each radio bearer.

REFERENCE SIGNS LIST

11 COMMUNICATION TERMINAL
12 COMMUNICATION DEVICE
13 COMMUNICATION DEVICE
14 CONTROL DEVICE
20 UE
21 MeNB
22 SeNB
23 MME
24 HSS
25 SGW
26 PGW
27 PCRF
28 AF
29 OFCS
30 OCS
41 TRANSMITTING AND RECEIVING UNIT
42 TRANSMITTING AND RECEIVING UNIT
43 CONTROLLER
51 BASE STATION COMMUNICATION UNIT
52 SGW COMMUNICATION UNIT
53 HSS COMMUNICATION UNIT

54 CONTROLLER
61 UE COMMUNICATION UNIT
62 BASE STATION COMMUNICATION UNIT
63 C-PLANE COMMUNICATION UNIT
64 U-PLANE COMMUNICATION UNIT
65 CONTROLLER
66 DATA MEASUREMENT UNIT

The invention claimed is:

1. A server comprising: at least one memory storing instructions, and at least one processor configured to execute the instructions to; hold an Access Restriction indicating subscription information, the Access Restriction including restriction information on a use of New Radio (NR), NR being provided by a second communication apparatus as a secondary Radio Access Technology (RAT) in dual connectivity with a first communication apparatus; and signal the Access Restriction to a management apparatus.

2. The server according to claim 1, wherein the Access Restriction is used to determine not to establish dual connectivity with NR as the secondary RAT.

3. The server according to claim 1, wherein dual connectivity with NR as the secondary RAT is not established if the Access Restriction indicates that a communication terminal is not allowed to use NR.

4. A management apparatus comprising: at least one memory storing instructions, and at least one processor configured to execute the instructions to; send information to a first communication apparatus in an Initial Context Setup Request message, the information related to an Access Restriction for New Radio (NR) for a communication terminal, NR provided by a second communication apparatus as a secondary Radio Access Technology (RAT) in dual connectivity with the first communication apparatus, wherein establishing dual connectivity with NR as the secondary RAT is determined based on the Access Restriction.

5. The management apparatus according to claim 4, wherein dual connectivity with NR as the secondary RAT is not established if the Access Restriction indicates that the communication terminal is not allowed to use NR.

6. A communication terminal comprising: at least one memory storing instructions, and at least one processor configured to execute the instructions to; communicate with a first communication apparatus providing a control plane connection to a core network, the first communication apparatus supporting dual connectivity; and be controlled not to use New Radio (NR) as a secondary Radio Access Technology (RAT) in dual connectivity if a management apparatus in the core network has an Access Restriction for NR for the communication terminal.

7. A method of a server, the method comprising: holding an Access Restriction indicating subscription information, the Access Restriction including restriction information on a use of New Radio (NR), NR being provided by a second communication apparatus as a secondary Radio Access Technology (RAT) in dual connectivity with a first communication apparatus; and signaling the Access Restriction to a management apparatus.

8. A method of a management apparatus, the method comprising: sending information to a first communication apparatus in an Initial Context Setup Request message, the information related to an Access Restriction for New Radio (NR) for a communication terminal, NR provided by a second communication apparatus as a secondary Radio Access Technology (RAT) in dual connectivity with the first communication apparatus, wherein establishing dual connectivity with NR as the secondary RAT is determined based on the Access Restriction.

9. A method of a communication terminal, the method comprising: communicating with a first communication apparatus providing a control plane connection to a core network, the first communication apparatus supporting dual connectivity; and being controlled not to use New Radio (NR) as a secondary Radio Access Technology (RAT) in dual connectivity if a management apparatus in the core network has an Access Restriction for NR for the communication terminal.

* * * * *